(12) United States Patent
Nagumo

(10) Patent No.: US 6,400,349 B1
(45) Date of Patent: Jun. 4, 2002

(54) DRIVING CIRCUIT AND LED HEAD WITH CONSTANT TURN-ON TIME

(75) Inventor: Akira Nagumo, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 09/241,727

(22) Filed: Feb. 2, 1999

(30) Foreign Application Priority Data

Feb. 10, 1998 (JP) ............................................ 10-028735
Sep. 24, 1998 (JP) ............................................ 10-269926

(51) Int. Cl.[7] ................................................ G09G 3/32
(52) U.S. Cl. ........................................ 345/82; 345/84
(58) Field of Search ............................ 345/82, 199, 84; 326/27, 83; 438/261; 372/38.01; 315/169.1, 169.2, 169.3, 169.4

(56) References Cited

U.S. PATENT DOCUMENTS

| | | | |
|---|---|---|---|
| 4,720,323 A | * 1/1988 | Sato | ........................... 438/261 |
| 4,734,714 A | 3/1988 | Takasu et al. | |
| 4,967,192 A | 10/1990 | Hirane et al. | |
| 5,465,058 A | * 11/1995 | Krenik et al. | .................. 326/83 |
| 5,469,195 A | * 11/1995 | Yung et al. | .................. 345/199 |
| 5,608,339 A | * 3/1997 | Fujiwara | ...................... 326/27 |
| 5,751,263 A | * 5/1998 | Huang et al. | .................. 345/82 |
| 5,761,230 A | * 6/1998 | Oono et al. | ............... 372/38.01 |
| 5,966,110 A | * 10/1999 | Van Zalinge | ................ 345/82 |

FOREIGN PATENT DOCUMENTS

| DE | 0 677948 A2 | 10/1995 |
|---|---|---|
| WO | WO9200196 | 1/1982 |

* cited by examiner

Primary Examiner—Steven Saras
Assistant Examiner—Uchendu O. Anyaso
(74) Attorney, Agent, or Firm—Rabin & Berdo, P.C.

(57) ABSTRACT

In a first aspect of the invention, a driven element is driven by a static driving element coupled in series with a switching element. The static driving element sets the driving current value. In a second aspect, a plurality of driven elements are driven by respective driving elements, which in turn are driven by respective pre-stage circuits, using a control voltage supplied by a single control-voltage generating circuit. Resistors inserted between the driving elements and pre-stage circuits limit transient current flow to a value within the output capability of the control-voltage generating circuit. In a third aspect, the pre-stage circuits have constant-current output characteristics, and the control-voltage generating circuit is designed to provide the necessary transient current, even when all driven elements are driven simultaneously.

18 Claims, 20 Drawing Sheets

DRIVING CIRCUIT AND LED HEAD WITH CONSTANT TURN-ON TIME

BACKGROUND OF THE INVENTION

The present invention relates to a driving circuit for selectively driving a plurality of driven elements, such as light-emitting diodes used as light sources in an electrophotographic printer, heating elements in a thermal printer, or display elements in a display device.

In the following description, the driven elements are be light-emitting diodes or LEDs employed in an electrophotographic printer.

In a conventional electrophotographic printer, for example, an electrically charged photosensitive drum is selectively illuminated, responsive to the data to be printed, to form a latent electrostatic image, which is developed by application of toner particles to form a toner image. The toner image is then transferred to paper and fused onto the paper.

FIG. 15 is a block diagram of the control circuitry of a conventional electrophotographic printer. FIG. 16 is a timing diagram illustrating the operation of the conventional electrophotographic printer.

The printing control unit 1 in FIG. 15 comprises a microprocessor, read-only memory, random-access memory, input-output ports, timers, and other elements disposed in the printing engine of the printer. The printing control unit 1 receives a control signal SG1 and a dot data signal SG2 from a higher-order controller, and controls the printing operations performed by the printing engine. The dot data signal SG2 is a one-dimensional digital signal representing a two-dimensional bit map of picture elements (pixels), referred to below as dots.

Upon receiving a print command via control signal SG1, the printing control unit 1 first checks a temperature sensor 23 to determine whether the fuser 22 is within the necessary temperature range. If the fuser 22 is not within the necessary temperature range, the printing control unit 1 activates a heater 22a built into the fuser 22. When the fuser 22 reaches the necessary temperature, the printing control unit 1 activates a driver 2 that drives a stepping motor or pulse motor (PM) 3 used in the developing and transfer process, and activates a charge signal SGC that switches on a high-voltage power source 25 that charges toner particles in a developer unit 27.

The presence or absence of paper and the size of the paper are detected by a paper sensor 8 and size sensor 9. If paper is present, the printing control unit 1 activates a driver 4 that drives another pulse motor (PM) 5. This motor is first driven in reverse by a certain amount, until paper is detected by a pick-up sensor 6, then driven forward to feed the paper into the printing engine.

When the paper has been fed to the necessary position, the printing control unit 1 sends timing signals SG3 (including horizontal and vertical synchronization signals) to the higher-order controller, and begins receiving the dot data signal SG2, which the higher-order controller generates on a page-at-a-time basis. The dot data signal SG2 is supplied as a data signal HD-DATA to an LED head 19 comprising a row of LEDs, with one LED per dot. The transfer of dot data into the LED head 19 is synchronized with a clock signal (HD-CLK).

After sufficient dot data (HD-DATA) for one horizontal dot line have been transferred into the LED head 19, the printing control unit 1 sends the LED head 19 a load signal (HD-LOAD), causing the dot data to be latched in the LED head 19. The LED head 19 can then print this line while receiving dot data for the next line.

The LED head 19 prints the line by illuminating a photosensitive drum (not visible) which has been precharged to a negative electrical potential. The potential level of illuminated dots rises, creating a latent dot image. The toner in the developer unit 27 is also charged to a negative potential, so toner particles are electrostatically attracted to the illuminated dots, creating a toner image.

The LEDs are turned on and off in synchronization with a strobe signal (HD-STB-N). FIG. 16 illustrates the timing of this signal and other signals mentioned above. The SG3 pulses shown at the top of FIG. 16 are horizontal synchronization pulses. FIG. 16 illustrates three successive line-printing cycles, for printing lines N−1, N, and N+1 (where N is an arbitrary integer).

Referring again to FIG. 15, to transfer the toner image to the paper, the printing control unit 1 activates a transfer signal SG4 that turns on a high-voltage power source 26, generating a high positive voltage in a transfer unit 28. As the paper travels through a narrow gap between the photosensitive drum and transfer unit 28, the toner image is transferred by electrostatic attraction to the paper.

The paper with the toner image is then transported to the fuser 22, which has been heated by the heater 22a. The heat fuses the toner to the paper, which then passes an exit sensor 7 and is ejected from the printer.

The printing control unit 1 controls these operations so that the high-voltage power source 26 is switched off except while the paper is traveling past the transfer unit 28, as detected by sensors 6 and 9. When the paper passes the exit sensor 7, the printing control unit 1 also switches off the high-voltage power source 25 of the developer unit 27, and stops the pulse motor (PM) 3 used in the developing and transfer process.

The above sequence is repeated for each page.

FIG. 17 shows the structure of the conventional LED head 19 in more detail. The dot data HD-DATA and clock signal HD-CLK are provided to a shift register comprising, for example, four thousand nine hundred ninety-two flip-flop circuits $FF_1$, $FF_2$, ..., $FF_{4992}$ (this number of flip-flop circuits is appropriate for printing on A4-size paper at six hundred dots per inch). When four thousand nine hundred ninety-two bits of dot data have been clocked into this shift register, the load signal HD-LOAD is activated, causing the bits to be stored in latches $LT_1$, $LT_2$, ..., $LT_{4992}$. When the strobe signal HD-STB-N is driven low, bits set to the high logic level ('1') turn on LEDs $LD_1$, $LD_2$, ..., $LD_{4992}$ by way of an inverter $G_0$, pre-buffer circuits $G_1$, $G_2$, ..., $G_{4992}$, and p-channel metal-oxide-semiconductor (MOS) transistors $Tr_1$, $Tr_2$, ..., $Tr_{4992}$. The transistors $Tr_1$, $Tr_2$, ..., $Tr_{4992}$ are the driving elements that allow driving current to flow from the power supply ($V_{DD}$) to the anodes of the LEDs $LD_1$, $LD_2$, ..., $LD_{4992}$.

In a printer employing the LED head in FIG. 17, all of the driven LEDs $LD_1$, $LD_2$, ..., $LD_{4992}$ are switched on for the same length of time, determined by the strobe signal HD-STB-N. Thus if these LEDs or the driving elements $Tr_1$, $Tr_2$, ..., $Tr_{4992}$ do not have perfectly uniform electrical properties, the dots will be unevenly illuminated. This will lead to differences in the sizes of the electrostatic dots in the latent image formed on the photosensitive drum, and differences in the sizes of the dots printed on the page.

Referring to FIG. 18, the LEDs are disposed on a plurality of LED array chips, which are coupled by bonding wires to integrated driver circuits, referred to below as driver ICs. In the example shown, there are twenty-six LED array chips (CHP1 to CHP26), each with one hundred ninety-two LEDs. Each LED is individually wire-bonded to an output terminal of the corresponding driver IC. The driver ICs (DRV1 to DRV26) are also coupled in a cascaded series to receive the dot data and control signals shown in FIG. 17.

FIG. 19 shows the internal structure of the first pre-buffer circuit ($G_1$) in FIG. 17, comprising an AND gate $AD_1$, a p-channel MOS transistor $TP_1$, and an n-channel MOS transistor $TN_1$. The other pre-buffer circuits $G_2$ to $G_{4992}$ are similar.

Each driver IC also has a control-voltage generating circuit 209. The control-voltage generating circuit 209 comprises an operational amplifier 100, a p-channel MOS transistor 101, and a resistor with resistance $R_{ref}$. The output of the operational amplifier 100 is coupled to all of the pre-buffer circuits in the same driver IC, more specifically to the source terminal of the n-channel MOS transistor in each pre-buffer circuit, e.g., $TN_1$ in pre-buffer circuit $G_1$. The p-channel MOS transistor 101 has the same gate length as each of the driving elements $Tr_1$, $Tr_2$, . . . , $Tr_{4992}$. The inverting input terminal of the operational amplifier 100 receives a reference voltage $V_{REF}$ from a voltage reference circuit (not visible). The operational amplifier 100, p-channel MOS transistor 101, and resistance $R_{ref}$ form a feedback circuit that sets the current $I_{ref}$ flowing through p-channel MOS transistor 101 to ground to a value determined by the reference voltage $V_{REF}$ and resistance $R_{ref}$, independent of the supply voltage $V_{DD}$.

In U.S. patent application Ser. No. 08/694,055, the present inventor proposed a driving apparatus with circuitry for efficiently compensating for chip-to-chip and dot-to-dot variations in the amount of light produced when each LED is driven. In U.S. patent application Ser. No. 09/083,065, the present inventor proposed a driving apparatus with further circuits that compensated for variations in optical output caused by temperature differences between the LED array chips. These two types of compensation circuits substantially eliminated the differences in the optical output characteristics of the individual LEDs, but it was subsequently found that under some printing conditions, slight printing irregularities still remained.

Further experiments showed that the remaining irregularities depended on the number of LEDs driven simultaneously by each driver IC in the LED head. The amount of optical energy to which each dot was exposed when only one dot was driven per chip differed from the amount of optical energy when a large number of dots were driven per chip, because of differences in the rise times of the driving current waveforms.

FIG. 20 shows examples of these rise times. The upper waveform in FIG. 20 is the waveform of the strobe signal (HD-STB-N). The lower waveforms ($I_{D1}$) indicate the driving current supplied to a single LED when one, eight, thirty-two, ninety-six, and one hundred ninety-two LEDs in the same LED array chip are driven simultaneously. As the number of driven LEDs (dots) increases, the rise time of the driving-current waveform ($I_{D1}$) increases markedly. As there is no great increase in the fall time, the increase in rise time significantly shortens the effective driving time of the LED. Consequently, when many LEDs are driven in the same LED array chip, each illuminated dot receives less light.

The difference in rise times arises for the following reason. When an LED such as $LD_1$ in FIG. 19 is driven, it needs to be driven by a current flow that is limited and does not vary, even if the power-supply voltage $V_{DD}$ fluctuates. The driving element $Tr_1$ thus needs to have a high output impedance and must operate with a constant-current characteristic. For these reasons, the driving element $Tr_1$ must have a comparatively large gate length. To provide adequate driving current to the LED, $Tr_1$ also has a comparatively large gate width. The large gate area of $Tr_1$ creates a large gate-source capacitance between the gate electrode wiring pattern and the semiconductor substrate of the driver IC.

When the strobe signal HD-STB-N is inactive (high), the output of the inverter comprising transistors $TP_1$ and $TN_1$ is high ($V_{DD}$), the source and gate of the driving element $Tr_1$ are at the same potential ($V_{DD}$), the gate-source capacitance of $Tr_1$ is in a discharged state, and $Tr_1$ is turned off. When a logic '1' is loaded from the shift register into latch $LT_1$ and the strobe signal HD-STB-N is asserted (driven low), the output of the inverter comprising transistors $TP_1$ and $TN_1$ changes from $V_{DD}$ to the control voltage $V_{control}$ output by the control-voltage generating circuit 209. A transient current $I_1$ flows from the power supply $V_{DD}$ to the output terminal of the operational amplifier 100, mainly through the capacitive coupling between the source and gate of the driving element $Tr_1$, charging the gate-source capacitance of $Tr_1$, thereby turning $Tr_1$ on.

When only one dot per driver IC is driven, the transient charging current $I_1$ is well within the current-sinking capability of the operational amplifier 100, despite the large gate-source capacitance of the driving element $Tr_1$. When many dots are driven simultaneously, however, the total flow of transient charging current from the gate-source capacitances of all of the activated driving elements becomes large enough to be limited by the current-sinking capability of the operational amplifier 100. Due to this limit, as more LEDs are driven, less current is available to charge the gate-source capacitance of each driving element, the driving elements turn on more slowly, and the rise time of the driving current waveforms increases.

When the strobe signal HD-STB-N goes high, the voltage output by the inverter comprising $TP_1$ and $TN_1$ rises from $V_{control}$ to $V_{DD}$. A transient current $I_0$ now flows from $V_{DD}$ through transistor $TP_1$ into the gate of the driving element $Tr_1$, discharging the gate-source capacitance, and $Tr_1$ turns off. The transient discharging currents $I_0$ are not concentrated onto a single terminal with limited current-sinking capability, and are substantially the same regardless of the number of dots driven simultaneously.

Accordingly, when many dots are driven simultaneously, the charging currents $I_1$ are limited, while the discharging currents $I_0$ are not. The rise times of the current waveforms are therefore lengthened, with no compensating lengthening of the fall times. As a result, the illuminated dots receive less light, their diameter is decreased, less toner is transferred, and the printed dots are insufficiently dark.

A further problem is that when the strobe signal HD-STB-N goes high and the driven LEDs are turned off, the rapid fall of the driving current causes voltage noise at the power-supply leads of the driver ICs. The voltage noise $\Delta V$ at a particular lead is given by the following equation, in which L is the lead inductance, $\Delta i$ is the total change in driving current supplied through the lead, and $\Delta t$ is the fall time of the current waveform.

$$\Delta V = L \times (\Delta i / \Delta t)$$

When many dots are driven, $\Delta i$ becomes large, while as FIG. 20 indicates, $\Delta t$ remains comparatively small. As a result, the voltage noise $\Delta V$ can become large enough to impair other operations in the driver IC. In the worst case, the driver IC can be damaged by the voltage noise.

SUMMARY OF THE INVENTION

It is accordingly an object of the present invention to supply driving current to a plurality of driven elements, at driving conditions that do not vary depending on the number of elements driven simultaneously.

Another object of the invention is to reduce voltage noise when the current supplied to the driven elements is switched off.

Another object is to provide an LED head in which the above objects are achieved.

According to a first aspect of the invention, each driven element is driven by a first driving element and a second driving element coupled in series. The first driving element sets the driving current to a predetermined value. The second driving element switches the driving current on and off.

In the first aspect, the first driving element operates statically. A substantially unlimited number of first driving elements can be coupled to the same control-voltage generating circuit without stressing the output capabilities of the control-voltage generating circuit.

According to a second aspect of the invention, a plurality of driven elements are driven by respective driving elements, which are switched on and off by respective pre-stage circuits. The pre-stage circuits are all coupled to a single control-voltage generating circuit, which supplies a control voltage used for switching the driving elements on. A resistor is inserted in series between each driving element and its pre-stage circuit.

In the second aspect, the resistors limit transient current flow to a value within the output capability of the control-voltage generating circuit, even when all of the driving elements are switched on simultaneously. The resistors also reduce voltage noise by making the driving elements turn off relatively slowly.

According to a third aspect of the invention, a plurality of driven elements are driven by respective driving elements, which are switched on and off by respective pre-stage circuits, all coupled to a single control-voltage generating circuit as in the second aspect of the invention. The pre-stage circuits operate with constant-current output characteristics.

In the third aspect, owing to the constant-current characteristics of the pre-stage circuits, the control-voltage generating circuit can be designed to provide the necessary output current, even when all driven elements are driven simultaneously. The constant-current characteristics can also be set so that the driven elements turn off slowly, thereby reducing voltage noise.

DETAILED DESCRIPTION OF THE INVENTION

Figure 15:
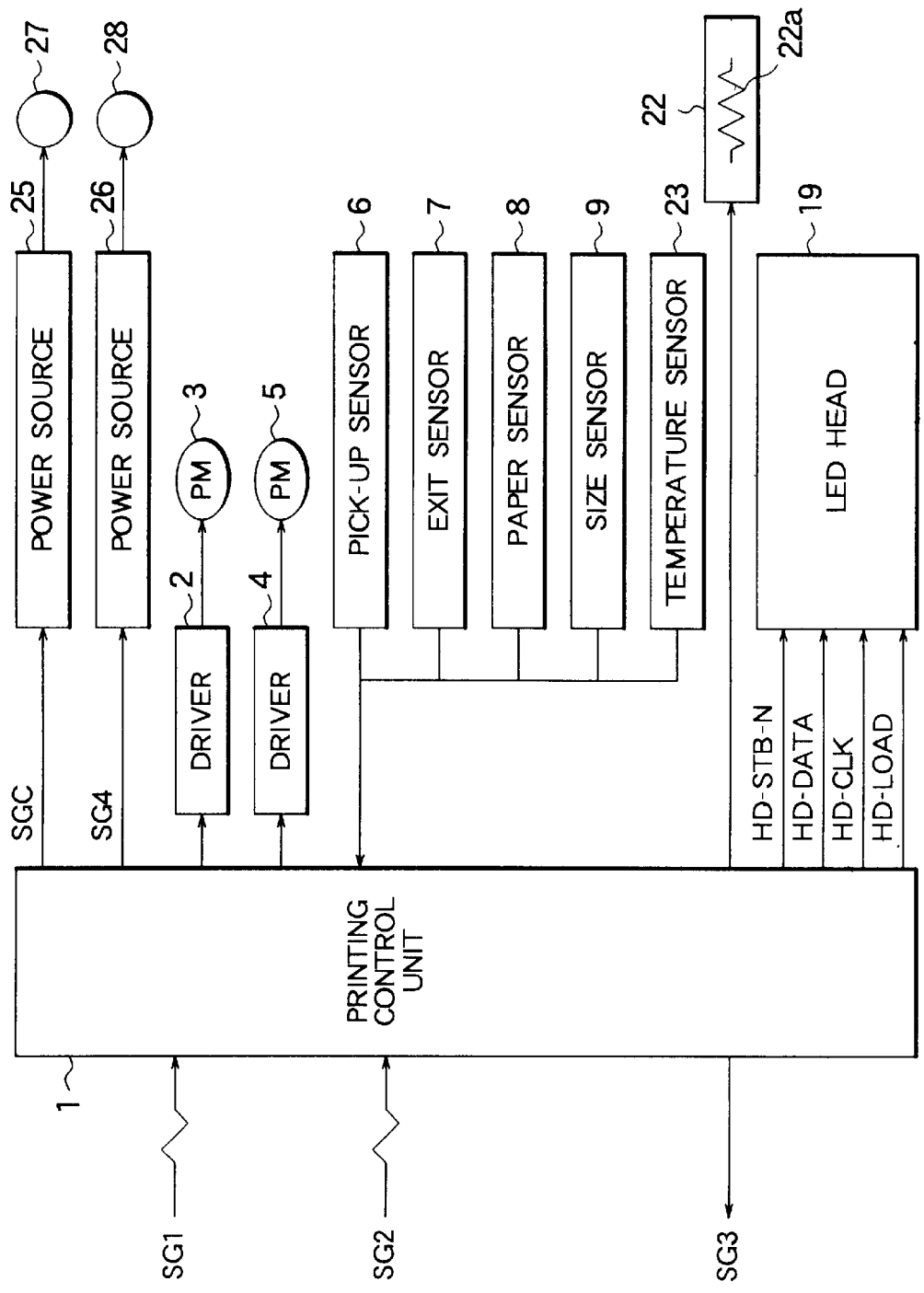
FIG. 15 is a block diagram of a conventional electrophotographic printer.
Figure 16:
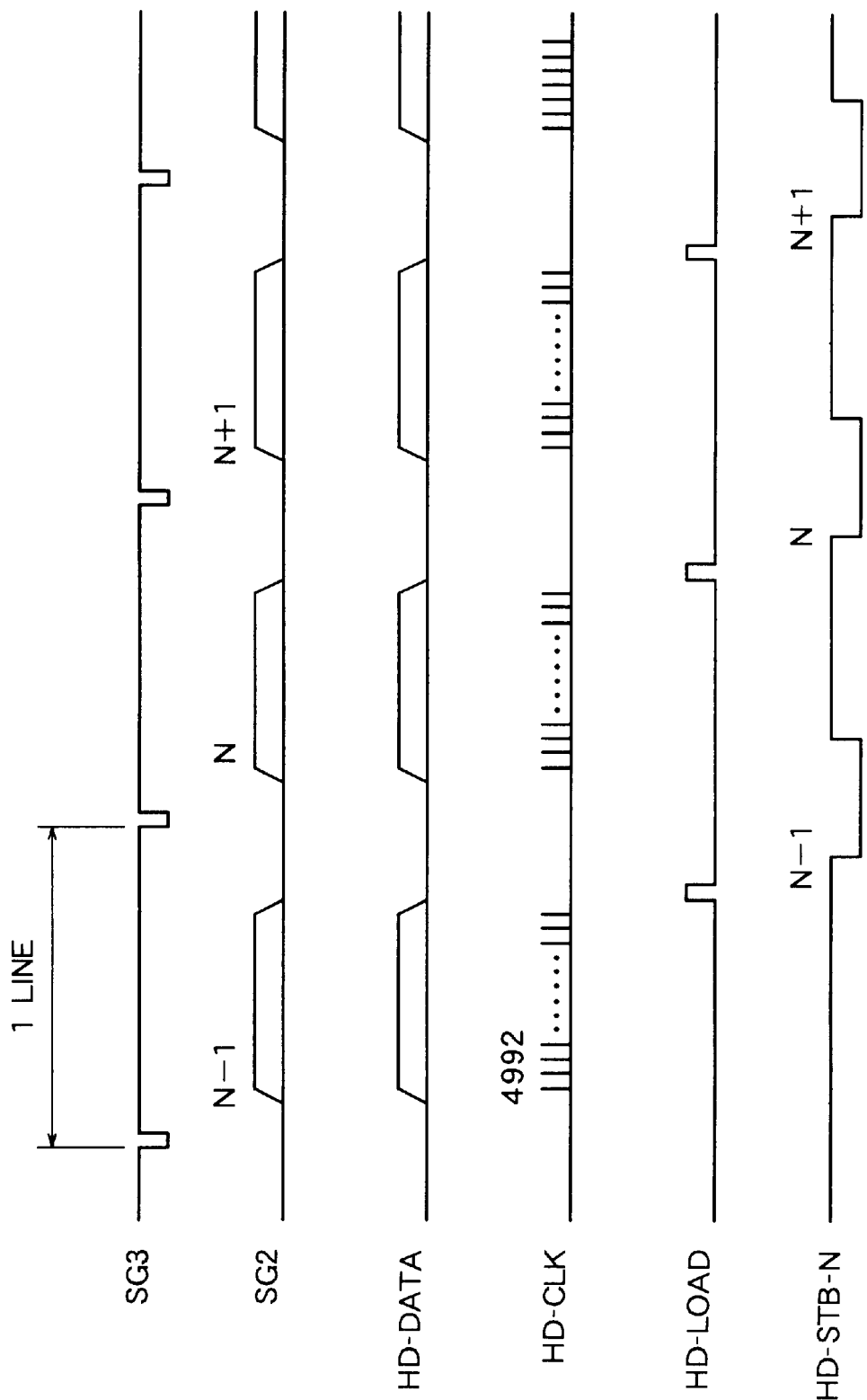
FIG. 16 is a waveform diagram illustrating the operation of the conventional electrophotographic printer.
Figure 17:
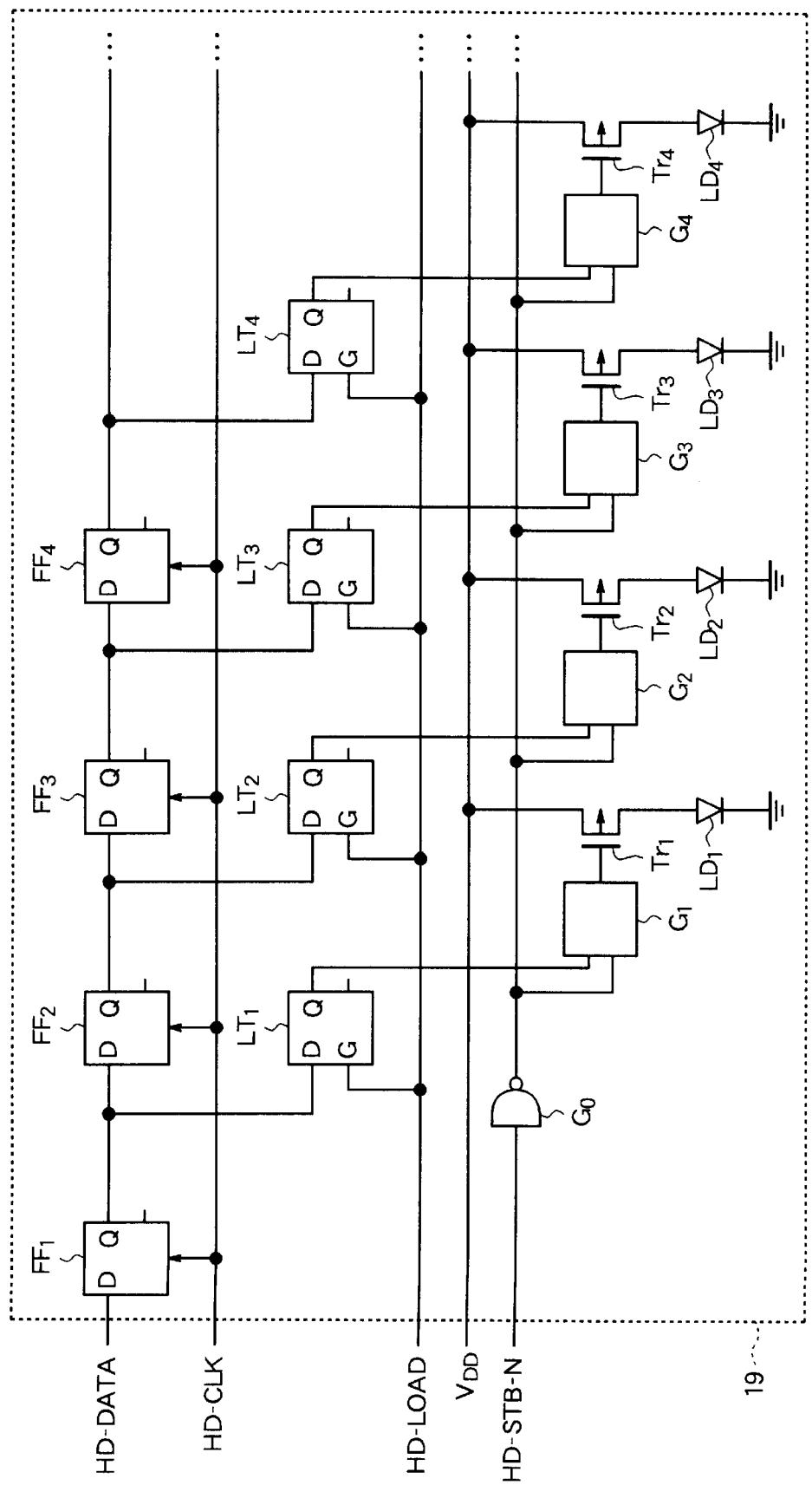
FIG. 17 is a circuit diagram of a conventional LED head.
Figure 18:
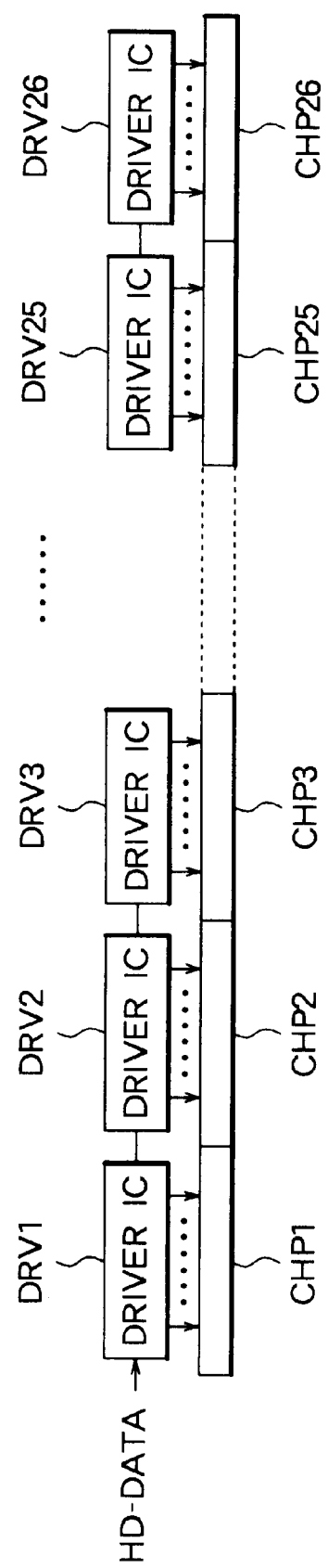
FIG. 18 is a block diagram of the conventional LED head.
Figure 19:
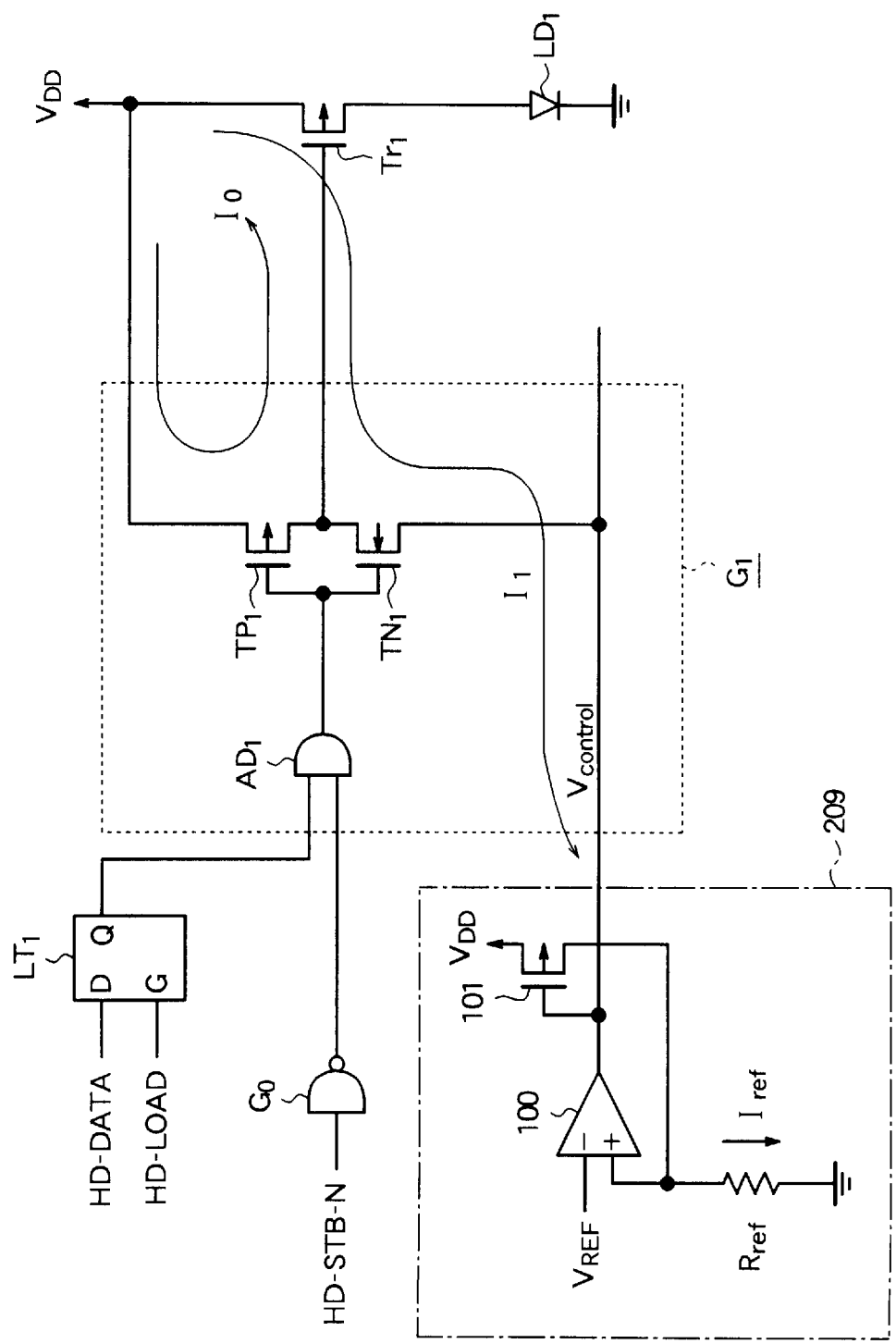
FIG. 19 is a circuit diagram of the LED driving circuit in the conventional LED head.

Embodiments of the invention will be described with reference to the attached drawings, in which like parts are indicated by like reference characters. The embodiments are driving circuits used in the LED head 19 of an electrophotographic printer of the type shown in FIG. 15.

Figure 1:
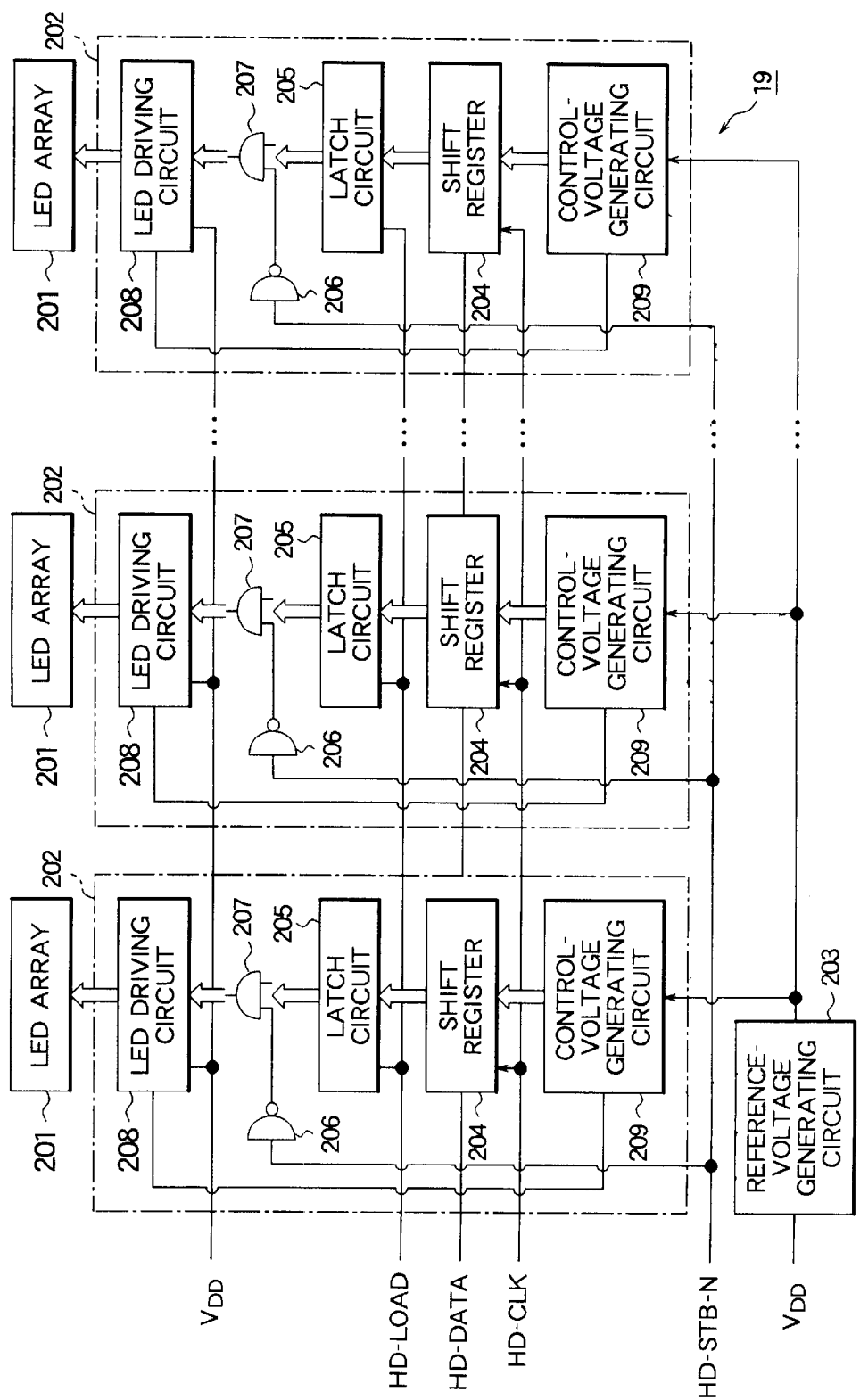
FIG. 1 is a block diagram of the LED head according to the invention.

FIG. 1 is a block diagram showing the general structure of the LED head 19 in all of the embodiments described below. The LED head comprises twenty-six LED array chips 201, twenty-six driver ICs 202, and a reference-voltage generating circuit 203. Each LED array chip 201 has a linear array of one hundred ninety-two LEDs (not visible). Each driver IC 202 has circuits for driving these LEDs, including a shift register 204, a latch circuit 205, an inverter 206, a gate circuit 207, an LED driving circuit 208, and a control-voltage generating circuit 209.

The shift register 204 comprises one hundred ninety-two flip-flop circuits through which printing data (HD-DATA) are shifted in synchronization with a clock signal (HD-CLK). The latch circuit 205 latches all bits of data stored in the shift register 204 at once, in synchronization with a load signal (HD-LOAD). The inverter 206 converts the strobe signal (HD-STB-N) from negative logic to positive logic for input to the gate circuit 207. The gate circuit 207 comprises one hundred ninety-two AND gates, each receiving the inverted strobe signal output by the inverter 206 and one bit of latched printing data output from the latch circuit 205. The LED driving circuit 208 comprises one hundred ninety-two parallel driving circuits that supply driving current to the LEDs in the LED array chip 201, in response to the outputs of the gate circuit 207. The control-voltage generating circuit 209 generates a control voltage that controls the current value of the driving current. The printing data (HD-DATA), clock signal (HD-CLK), load signal (HD-LOAD), and strobe signal (HD-STB-N) are supplied from the printing control unit 1 in FIG. 15.

The LED head preferably also has temperature compensation circuits and circuits for compensating for dot-to-dot and chip-to-chip differences. For simplicity, these compensation circuits are omitted from the drawings.

Figure 2:
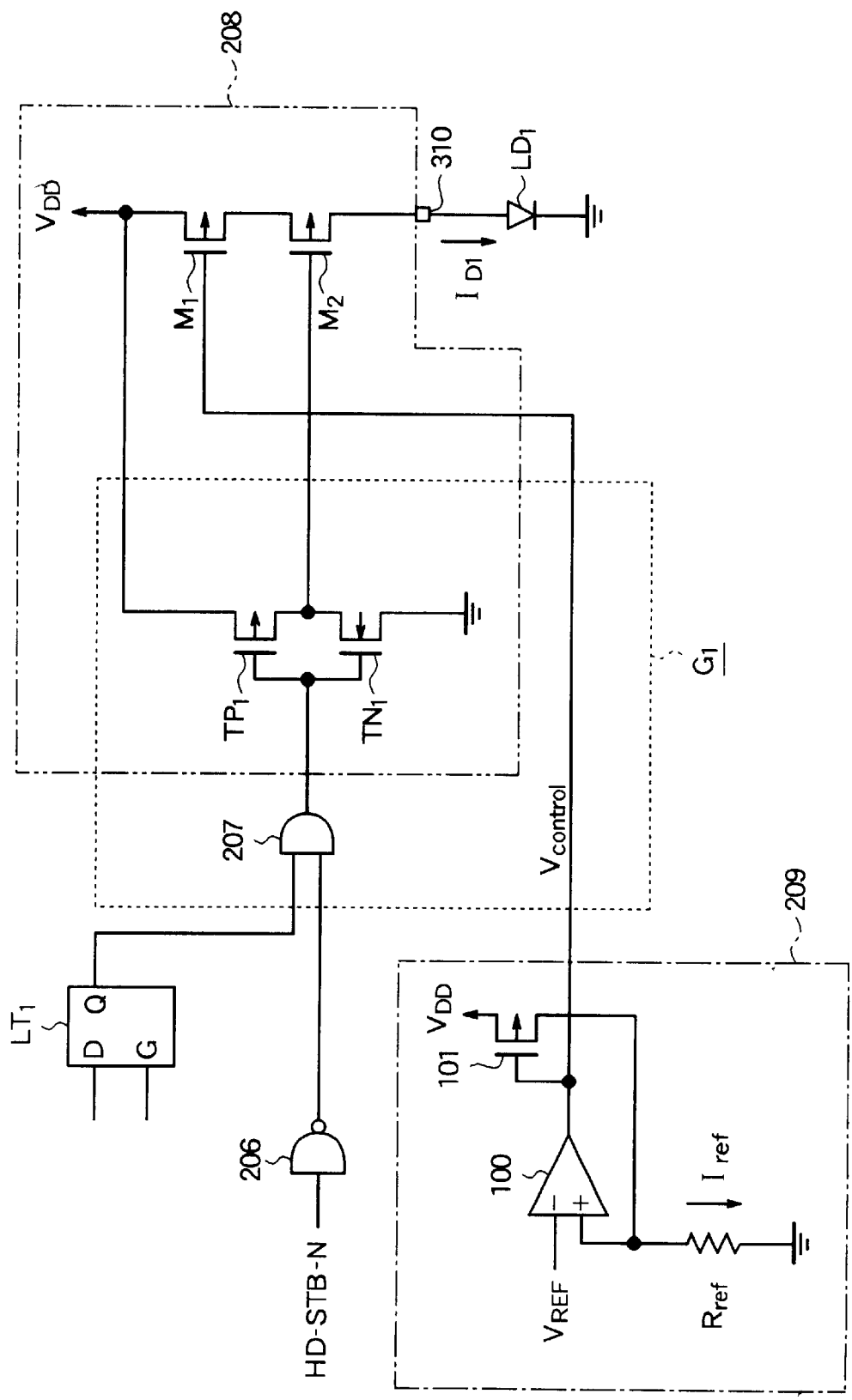
FIG. 2 is a circuit diagram showing the configuration of the LED driving circuit in the LED head, according to a first embodiment of the invention.

FIG. 2 shows the circuit structure of one of the one hundred ninety-two parallel driving circuits in the LED driving circuit 208 in a first embodiment of the invention. The driving circuit comprises a p-channel MOS transistor $TP_1$, an n-channel MOS transistor $TN_1$, and a further pair of p-channel MOS transistors $M_1$ and $M_2$. Transistors $M_1$ and $M_2$ are the driving elements. Transistor $M_1$ functions as a current-limiting element; transistor $M_2$, as a switching element.

The source terminal of p-channel MOS transistor $TP_1$ is coupled to a power-supply node, and receives the power-supply potential $V_{DD}$. The source terminal of n-channel MOS transistor $TN_1$ is coupled to ground. The drain terminals of transistors $TP_1$ and $TN_1$ are mutually interconnected. The gate terminals of transistors $TP_1$ and $TN_1$ are both coupled to the output of an AND gate in the gate circuit 207, so that transistors $TP_1$ and $TN_1$ function as an inverter. These transistors $TP_1$ and $TN_1$ and the AND gate form a pre-stage circuit or pre-buffer circuit $G_1$, which has the inverter comprising transistors $TP_1$ and $TN_1$ as its output stage.

The source terminal of p-channel MOS transistor $M_1$ is coupled to the power-supply ($V_{DD}$) node. The drain terminal of p-channel MOS transistor $M_1$ is coupled to the source terminal of p-channel MOS transistor $M_2$. The drain terminal of p-channel MOS transistor $M_2$ is coupled to an output terminal 310 of the driver IC 202. The output terminal 310 is coupled to the anode of an LED ($LD_1$) in one of the LED array chips 201 shown in FIG. 1. The cathode of $LD_1$ is coupled to ground. The gate terminal of transistor $M_2$ is coupled to the drain terminal of transistor $TP_1$; that is, to the output of the inverter comprising transistors $TP_1$ and $TN_1$. The gate terminal of transistor $M_1$ is coupled to the output terminal of the control-voltage generating circuit 209.

The control-voltage generating circuit 209 has the conventional structure, comprising an operational amplifier 100, a p-channel MOS transistor 101, and a resistor with resistance $R_{ref}$. The reference voltage $V_{REF}$ is supplied from the reference-voltage generating circuit 203 in FIG. 1. The gate terminal of p-channel MOS transistor $M_1$ and the gate terminal of p-channel MOS transistor 101 are both coupled to the output terminal of the operational amplifier 100, and receive the control voltage $V_{control}$.

All of the transistors shown in FIG. 2 are fabricated by a semiconductor fabrication process with a design rule that sets a minimum size for gate lengths, gate widths, and other features. The gate lengths of p-channel MOS transistors 101 and $M_1$ are identically larger than this minimum feature size. The gate width of p-channel MOS transistor $M_1$ is also larger than the minimum feature size. The gate width of p-channel MOS transistor $M_2$ is, for example, the same as the gate width of p-channel MOS transistor $M_1$. The gate length of p-channel MOS transistor $M_2$ is equal to the minimum feature size.

Figure 3:
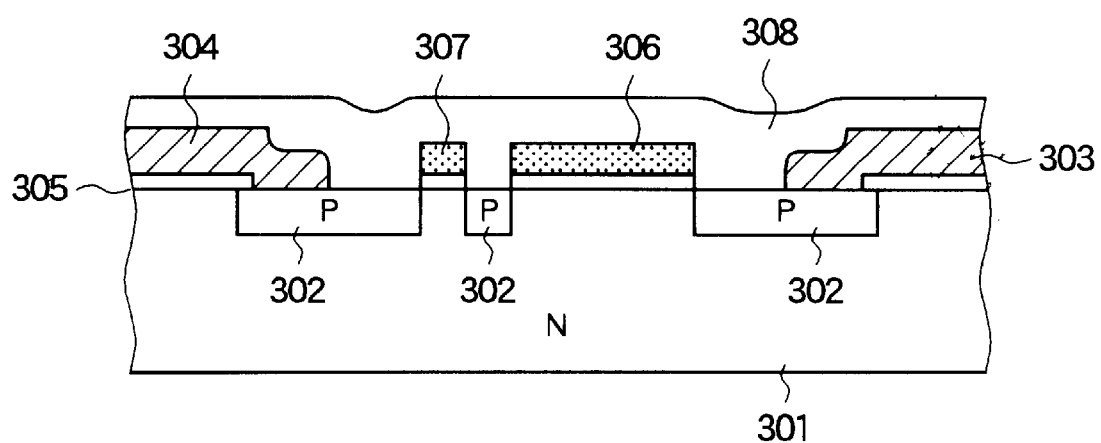
FIG. 3 is a sectional view of the structure of the two driving transistors in FIG. 2.

FIG. 3 is a sectional view of the structure of p-channel MOS transistors $M_1$ and $M_2$, which are formed in an n-type semiconductor substrate 301. The source and drain regions of these transistors comprise p-type diffusions 302. Interconnecting lines 303 and 304, made in a metal wiring layer, lead to the power-supply node marked $V_{DD}$ in FIG. 2 and to the output terminal 310, respectively. The interconnecting lines 303, 304 are isolated from the semiconductor substrate 301 by an oxide insulating layer 305. The gate electrodes 306 and 307 are similarly insulated by an oxide layer from the semiconductor substrate 301.

The long gate electrode 306 is the gate terminal of p-channel MOS transistor $M_1$; the short gate electrode 307 is the gate terminal of p-channel MOS transistor $M_2$. The combined size of transistors $M_1$ and $M_2$ is reduced by placing their gate electrodes 306, 307 side by side. The gate electrodes 306, 307 and interconnecting lines 303, 304 are covered with a glass insulating layer 308.

Next, the operation of the first embodiment will be described.

First, the operation of the control-voltage generating circuit 209 in FIG. 2 will be described. The gate potential of the p-channel MOS transistor 101 is controlled by feedback through the operational amplifier 100 to maintain a constant reference current $I_{ref}$ equal to the reference voltage $V_{REF}$ divided by the resistance $R_{ref}$. The values of $V_{REF}$ and $R_{ref}$ are selected so that transistor 101 operates in its saturation region, in which $I_{ref}$ is determined by the gate-source voltage of transistor 101, which is equal to the difference between the supply voltage $V_{DD}$ and the control voltage $V_{control}$. The operational amplifier 100 varies $V_{control}$ to follow any variations in $V_{DD}$, keeping the gate-source voltage of transistor 101 constant.

Next, the operation of the current-limiting p-channel MOS transistor $M_1$ will be described. The gate-source voltage of transistor $M_1$ is also equal to the difference between $V_{DD}$ and $V_{control}$. Since the operational amplifier 100 holds this difference constant, there is no flow of charging or discharging current into the gate-source capacitance of transistor $M_1$. Transistor $M_1$ is always turned on. When the switching transistor $M_2$ is also turned on, transistor $M_1$ immediately allows a predetermined driving current $I_{D1}$ to flow to the driven LED ($LD_1$). Since transistor $M_1$ has the same gate-source voltage and the same gate length as the p-channel MOS transistor 101 in the control-voltage generating circuit 209, these two transistors form a current mirror, and the driving current $I_{D1}$ is proportional to the reference current $I_{ref}$. Transistor $M_1$ operates in its saturation region, and the driving current $I_{D1}$ is held substantially constant, regardless of variations in the power-supply or ground potential.

Next, the operation of the switching transistor $M_2$ will be described. The gate-source capacitance of transistor $M_2$ is comparatively small, because of the minimal length of the gate electrode 307. When the pre-buffer circuit $G_1$ switches from high to low output, the gate electrode 307 of transistor $M_2$ is quickly charged to the ground potential by a transient current flow through n-channel MOS transistor $TN_1$, and transistor $M_2$ turns on. When the pre-buffer circuit $G_1$ switches from low to high output, the gate electrode 307 quickly discharges to the $V_{DD}$ potential through p-channel MOS transistor $TP_1$, and transistor $M_2$ turns off. The turn-on and turn-off times are substantially unaffected by the number of dots driven simultaneously, because the charging and discharging currents flow through a different transistor for each dot.

Next, the overall operation of the first embodiment will be described. To drive LED $LD_1$, a '1' is loaded from the shift register 204 in FIG. 1 into the latch $LT_1$ in FIG. 2. The loading occurs while the strobe signal HD-STB-N is high, making the output of inverter 206 and the outputs of all AND gates in the gate circuit 207 low. The low output of the AND gate in FIG. 2 is inverted by the inverter comprising transistors $TP_1$ and $TN_1$. The pre-buffer circuit $G_1$ is therefore in the high output state, and the switching transistor $M_2$ is turned off. When the strobe signal HD-STB-N is asserted (driven low), the outputs of the inverter 206 and the AND gate go high, the output of the pre-buffer circuit $G_1$ goes low, the switching transistor $M_2$ turns on, and driving current $I_{D1}$ is supplied to $LD_1$. When the strobe signal HD-STB-N goes high again, the switching transistor $M_2$ turns off and the flow of driving current stops.

Figure 4:
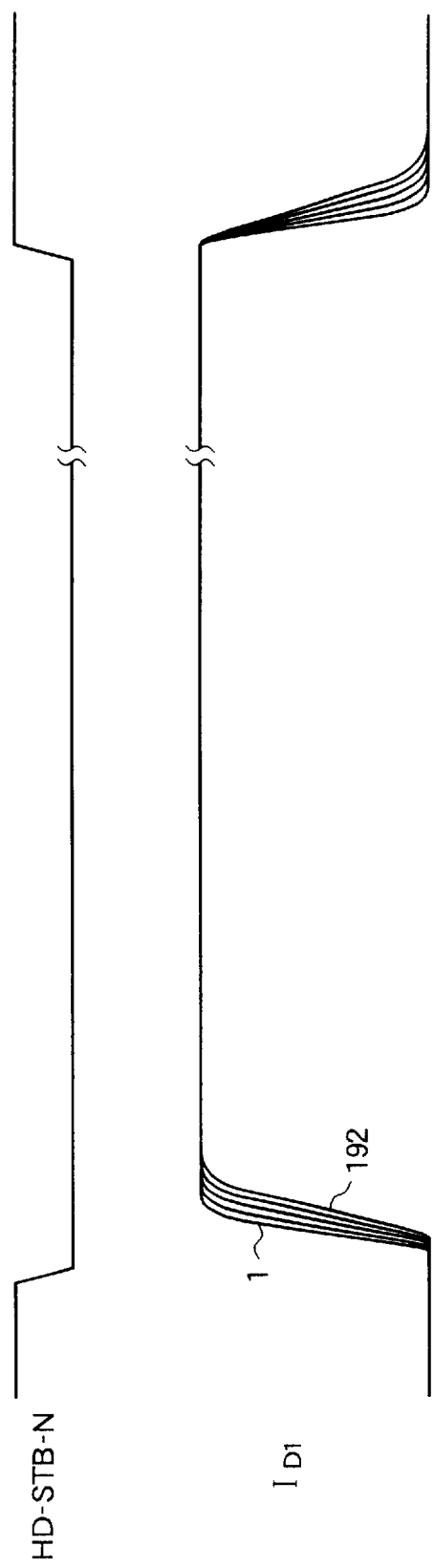
FIG. 4 is a waveform diagram illustrating the operation of the first embodiment.

FIG. 4 shows waveforms illustrating these operations. The upper waveform is the waveform of the strobe signal HD-STB-N; the lower waveforms indicate the driving current $I_{D1}$ supplied to LED $LD_1$ when one, eight, thirty-two, ninety-six, and one hundred ninety-two LEDs are driven simultaneously by the same driver IC 202. As the number of driven dots (LEDs) increases, there is some increase in the rise time of the driving current waveform $I_{D1}$. The increase is due, for example, to a voltage-noise effect. There is also some increase in the fall time of the driving current waveform $I_{D1}$, for a similar reason. Both increases are slight, however, and the amount of driving current supplied to each LED is substantially unaffected by the number of driven dots. The large increase in rise time that was observed in the prior art, due to the limited current-sinking capability of the operational amplifier 100, is not observed in FIG. 4.

To summarize the first embodiment, each LED is driven by two p-channel MOS transistors $M_1$ and $M_2$ coupled in series. Transistor $M_1$, which has a long gate length and comparatively low saturation current, limits the driving current to a desired constant value. Transistor $M_2$, which has a minimal gate length, switches the driving current on and off. The current-limiting transistor $M_1$ operates in a completely static manner, without being affected by the number of dots driven simultaneously. The switching transistor $M_2$ is driven by an independent pre-buffer circuit for each dot, so its operation is also substantially unaffected by the number of dots driven simultaneously; in particular, its transient characteristics (rise time and fall time) are substantially unaffected. By separating the current-limiting function from the current-switching function, the first embodiment substantially eliminates variations in current driving time due to the number of dots driven simultaneously.

Next, a second embodiment will be described.

Figure 5:
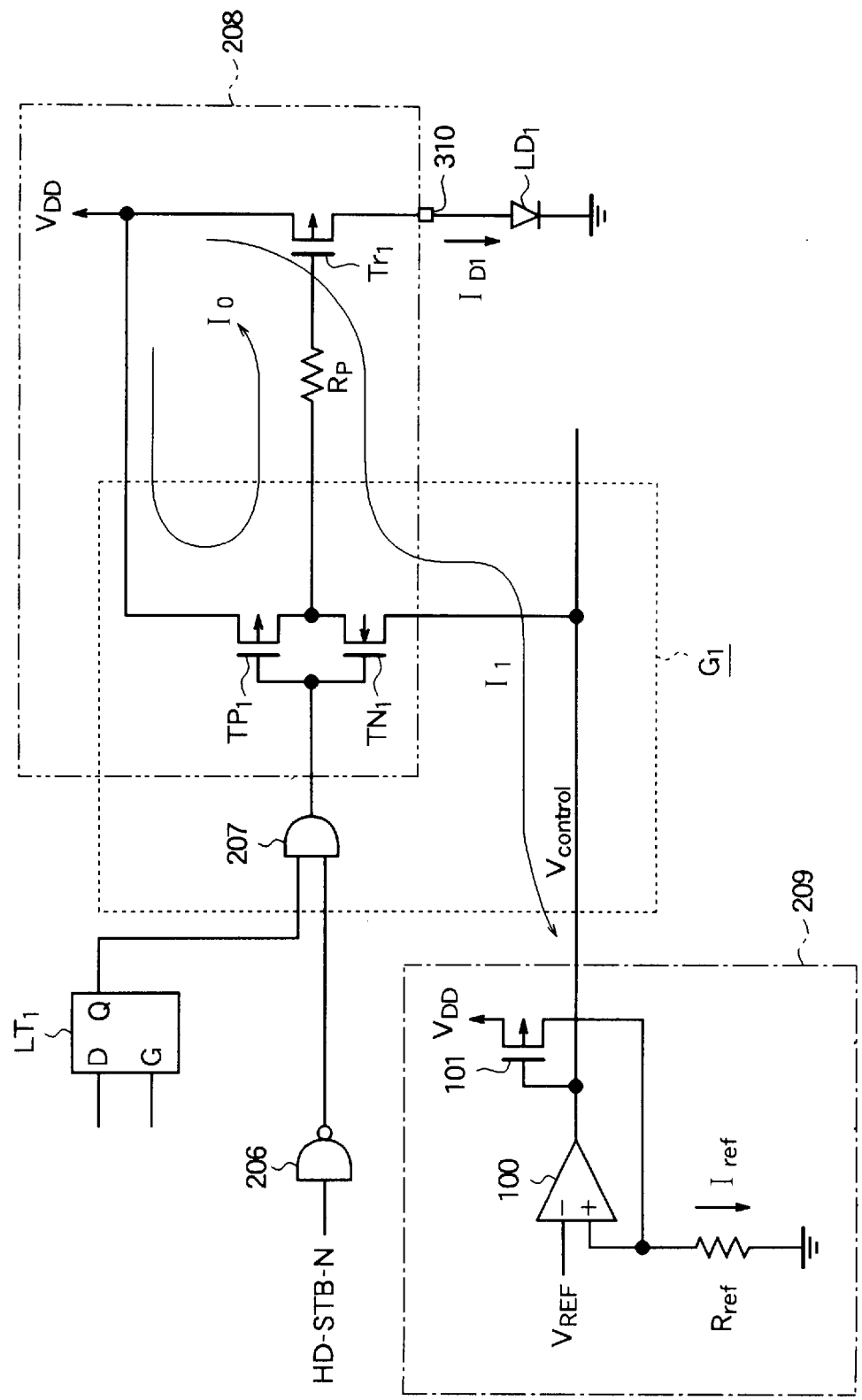
FIG. 5 is a circuit diagram showing the configuration of the LED driving circuit in a second embodiment of the invention.

Referring to FIG. 5, the LED driving circuit 208 in the second embodiment also has a pre-buffer circuit $G_1$ with an output stage, comprising a p-channel MOS transistor $TP_1$ and an n-channel MOS transistor $TN_1$, that inverts the output of an AND gate in the gate circuit 207. The source of transistor $TP_1$ is coupled to the power supply $V_{DD}$, but the source of transistor $TN_1$ is coupled to the output terminal of the operational amplifier 100 in the control-voltage generating circuit 209, as in the prior art. The control voltage $V_{control}$ functions as the ground potential of the output stage of the pre-buffer circuit $G_1$.

The drain terminals of transistors $TP_1$ and $TN_1$ are coupled through a current-limiting resistor $R_P$ to the gate of a p-channel MOS transistor $Tr_1$. The resistance of resistor $R_P$ is preferably at least one hundred ohms (100Ω), but not more than ten thousand ohms (10 kΩ).

The p-channel MOS transistor $Tr_1$ is the driving element. Its source terminal is coupled to the power supply $V_{DD}$; its drain terminal is coupled to an output terminal 310 of the driver IC 202, thus to the anode of a driven LED ($LD_1$). Transistor $Tr_1$ has a comparatively long and wide gate electrode, the gate length matching the gate length of the p-channel MOS transistor 101 in the control-voltage generating circuit 209.

The other elements are the same as in the first embodiment.

Next, the operation of the second embodiment will be described.

When p-channel MOS transistor $TP_1$ is turned off and n-channel MOS transistor $TN_1$ is turned on, p-channel MOS transistor $Tr_1$ and p-channel MOS transistor 101 have the same source potential ($V_{DD}$) and gate potential ($V_{control}$), and form a current mirror. In this state, transistor $Tr_1$ supplies LED $LD_1$ with a predetermined driving current $I_{D1}$, proportional to the reference current $I_{ref}$. When p-channel MOS transistor $TP_1$ is turned on and n-channel MOS transistor $TN_1$ is turned off, p-channel MOS transistor $Tr_1$ is turned off and driving current $I_{D1}$ ceases to flow.

To drive the LED $LD_1$, a '1' is loaded from the shift register 204 into the latch $LT_1$, then the strobe signal HD-STB-N is asserted. The low logic level of the strobe signal is inverted by the inverter 206, passed through the gate circuit 207, then inverted again by the inverter comprising transistors $TP_1$ and $TN_1$, the output potential of which changes from $V_{DD}$ to the control voltage $V_{control}$. The gate potential of p-channel MOS transistor $Tr_1$ is thereby reduced to $V_{control}$, causing transistor $Tr_1$ to turn on.

While transistor $Tr_1$ is turning on, a transient current $I_1$ flows from the power supply $V_{DD}$ to the output terminal of the operational amplifier 100, mainly through the capacitive coupling between the gate electrode of p-channel MOS transistor $Tr_1$ and the semiconductor substrate of the driver IC, charging the gate-source capacitance. This transient current $I_1$ is forced to flow through the current-limiting resistor $R_P$, the resistance of which is high enough to assure that even if a large number of dots are driven simultaneously, the total transient current flow will be within the current-sinking capability of the operational amplifier 100.

Consequently, although charging the gate-source capacitance of p-channel MOS transistor $Tr_1$ takes time, the time is substantially independent of the number of dots being driven. The dependence of the rise time of the driving current waveform on the number of driven dots is greatly reduced, as compared with the prior art.

When the p-channel MOS transistor $Tr_1$ is switched off by negation of the strobe signal HD-STB-N, the output of the gate circuit 207 changes from high to low, and the output of the inverter comprising transistors $TP_1$ and $TN_1$ changes from the control voltage $V_{control}$ to the power-supply potential $V_{DD}$. Discharging current $I_0$ then flows from $V_{DD}$ into the gate-source capacitance of transistor $Tr_1$. The discharging current $I_0$ is also limited by the current-limiting resistor $R_P$, forcing transistor $Tr_1$ to turn off more slowly than in the prior art. Voltage noise $\Delta V$ at the power-supply leads of the driver IC is inversely proportional to the turn-off time $\Delta t$, as shown by the equation given earlier. Voltage noise is accordingly reduced. Since the discharging current $I_0$ flows through an independent circuit for each dot, the flow of discharging current for any one dot is substantially independent of the number of dots being driven.

The transition times (rise time and fall time) of the LED driving current are, accordingly, substantially unaffected by the number of dots driven simultaneously, and are long enough to suppress potentially harmful voltage noise.

Figure 6:
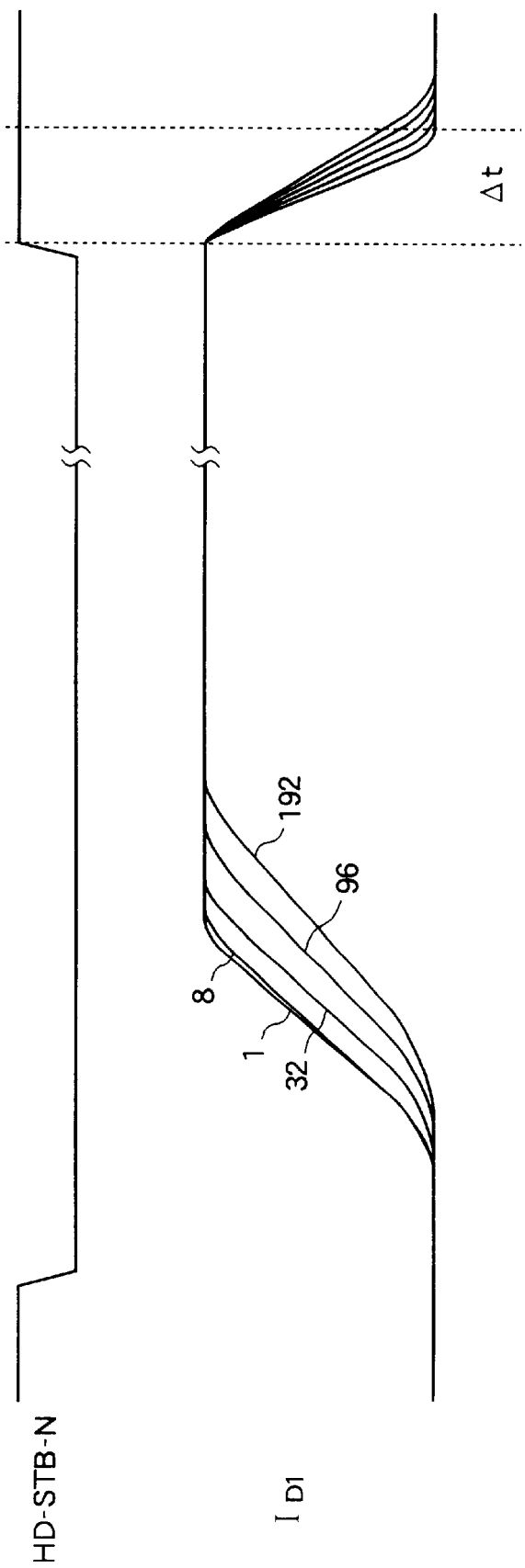
FIG. 6 is a waveform diagram illustrating the operation of the second embodiment.

FIG. 6 shows waveforms of the strobe signal HD-STB-N and the LED driving current $I_{D1}$ in the second embodiment.

Figure 20:
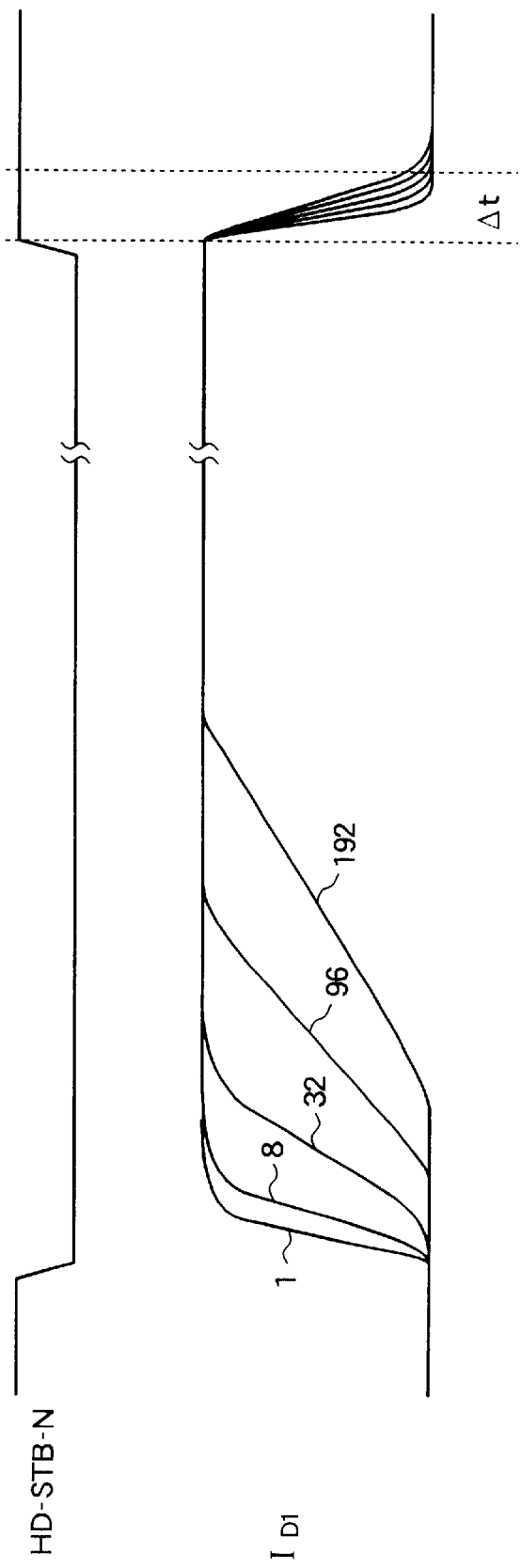
FIG. 20 is a waveform diagram illustrating the operation of the conventional LED head.

The driving current waveforms shown in the lower part of the drawing are labeled according to the number of dots driven simultaneously, from one to one hundred ninety-two. Both the rise times and the fall times are lengthened, as compared with the first embodiment. Although there is some difference in the rise times of the driving current waveforms, depending on the number of driven dots, the difference is not nearly as large as in the prior art (FIG. 20). There is very little difference in the fall times Δt.

To summarize the second embodiment, a current-limiting resistor is inserted between the pre-buffer circuit $G_1$ and the driving element $Tr_1$, so that even when all dots are driven simultaneously, the total transient current is within the current-sinking capability of the operational amplifier 100. The dependence of the turn-on time of the driving element $Tr_1$ on the number of driven dots is thereby reduced to a level that can be ignored in practice. The turn-off times of the driving elements are also lengthened, reducing voltage noise at IC leads.

Figure 7:
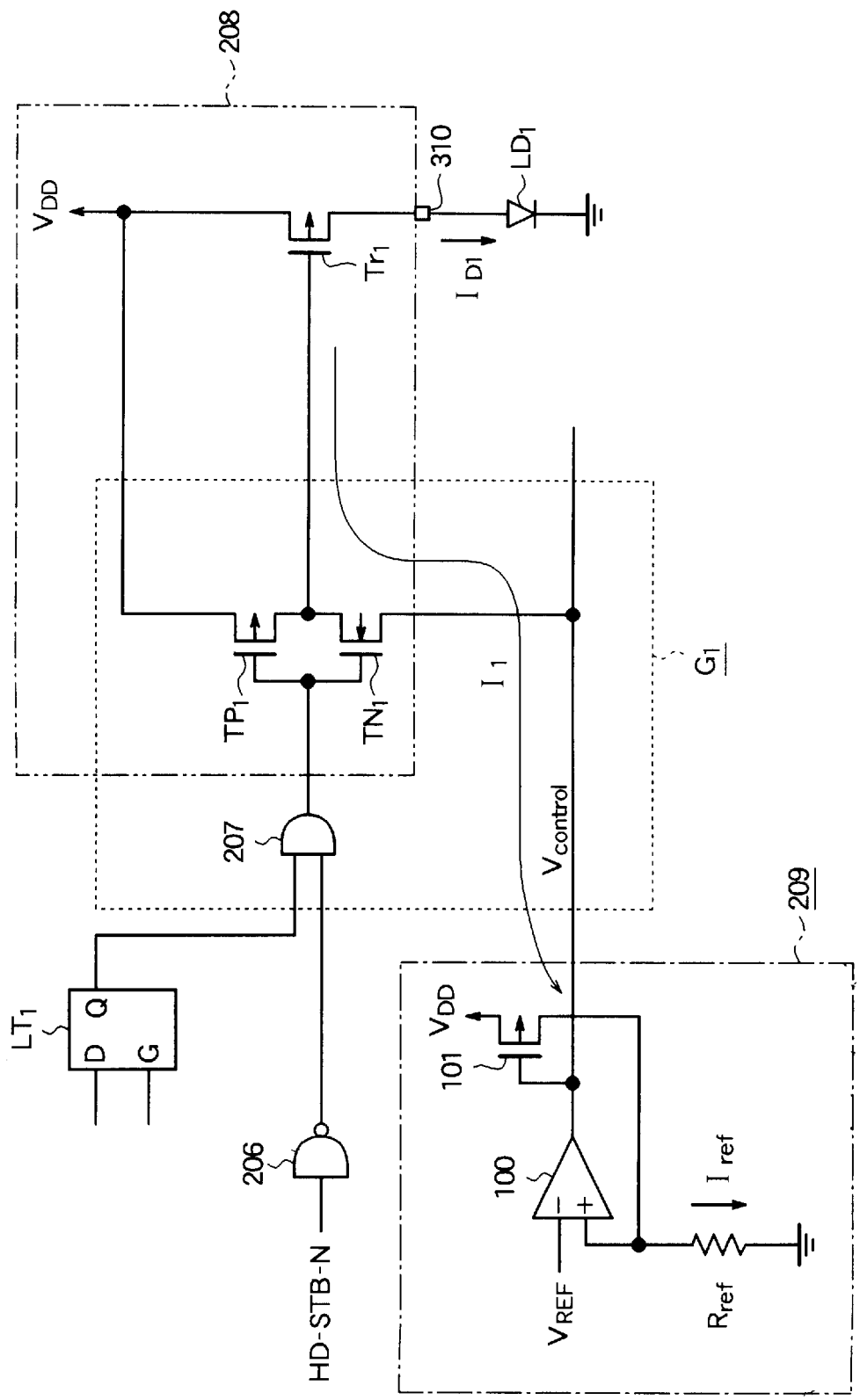
FIG. 7 is a circuit diagram showing the configuration of the LED driving circuit in a third embodiment of the invention.

Next, a third embodiment of the invention will be described. Referring to FIG. 7, the LED driving circuit 208 in the second embodiment has a circuit topology similar to that of the second embodiment without the current-limiting resistor $R_P$. The drain terminals of p-channel MOS transistor $TP_1$ and an n-channel MOS transistor $TN_1$ in the output stage of the pre-buffer circuit $G_1$ are coupled directly to the gate terminal of p-channel MOS transistor $Tr_1$, which is the driving element. A feature of the third embodiment is that the n-channel MOS transistor $TN_1$ has a comparatively long gate length, causing the pre-buffer circuit $G_1$ to operate with a substantially constant-current output characteristic when charging the gate-source capacitance of the driving element $Tr_1$.

When the n-channel MOS transistor $TN_1$ is turned on by high output from the gate circuit 207, the gate potential of transistor $TN_1$ is the power-supply potential $V_{DD}$, while its source potential is the $V_{control}$ potential output by the control-voltage generating circuit 209. The gate-source voltage ($V_{GS}$) of transistor $TN_1$ is accordingly the difference between $V_{DD}$ and $V_{control}$. Under typical operating conditions, $V_{DD}$ is five volts (5 V), $V_{control}$ is 3.4 V, and $V_{GS}$ is 1.6 V. These values will be assumed below.

Figure 8:
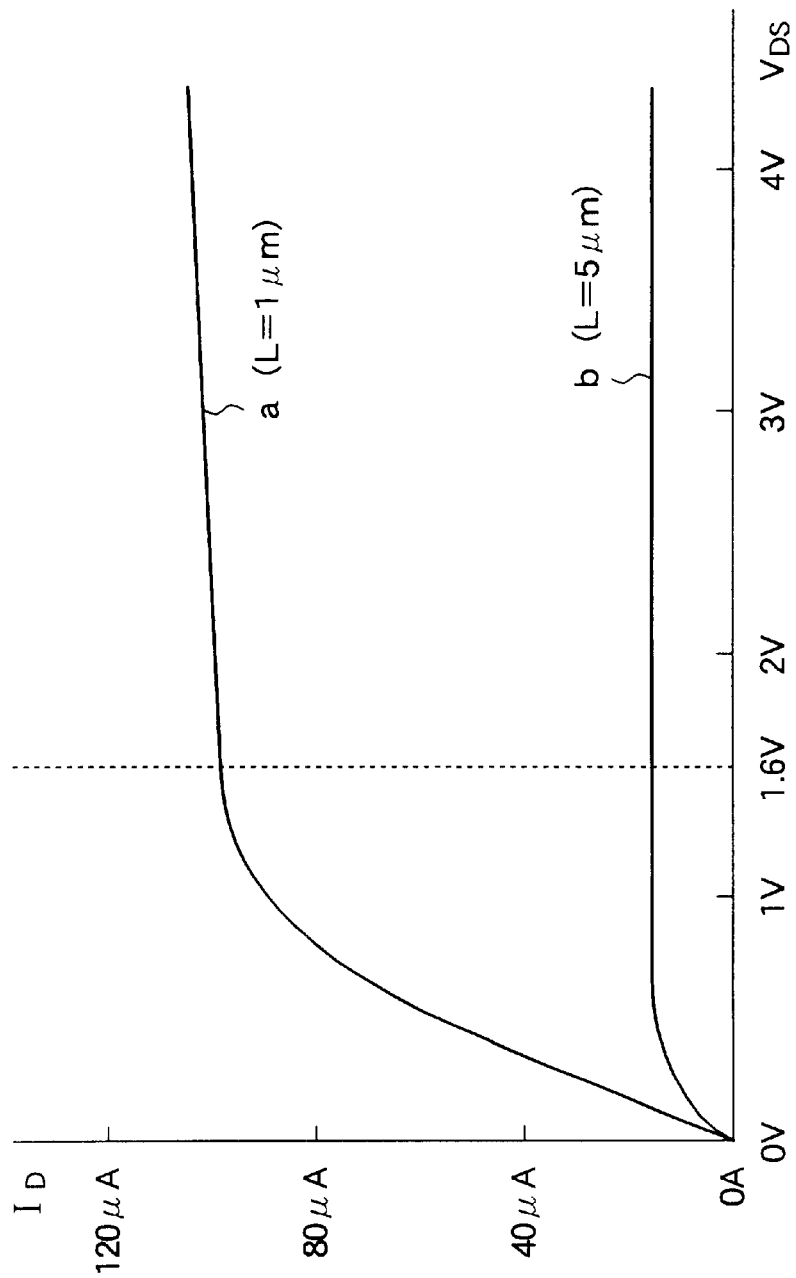
FIG. 8 is a graph illustrating the dependence of the drain current characteristic of a MOS transistor on its gate length.

FIG. 8 shows examples of the drain current characteristic of the n-channel MOS transistor $TN_1$ for gate lengths L of one micrometer (1 μm, curve a) and five micrometers (5 μm, curve b). Drain current ($I_D$) is indicated in microamperes (μA) on the vertical axis, and drain-source voltage ($V_{DS}$) in volts on the horizontal axis. Both characteristics assume a gate-source voltage $V_{GS}$ of 1.6 V. The region to the left of the dotted line, in which the drain-source voltage $V_{DS}$ is equal to or less than the gate-source voltage $V_{GS}$, is of particular interest in the present embodiment. FIG. 8 indicates that by choosing an appropriate gate length, the drain current $I_D$ can be limited to a small value (less than 20 μA for a 5-μm gate length), and transistor $TN_1$ can be made to operate at this limited value with a substantially constant-current characteristic over most of the region of interest ($V_{DS} \leq 1.6$ V).

The theoretical explanation for these characteristics is that when the drain-source voltage $V_{DS}$ exceeds the difference between the gate-source voltage ($V_{GS}$) and a threshold voltage $V_t$, the drain current $I_D$ saturates at a value $I_{DSS}$ given by the following equation, in which W is the gate width, L is the gate length, and β is a constant.

$$I_{DSS} = (W/L) \times \beta \times (V_{GS} - V_t)^2$$

Increasing the gate length L reduces the saturation current $I_{DSS}$ by reducing W/L, and by increasing the threshold voltage $V_t$. The increase in $V_t$ also enlarges the saturation region.

Figure 9:
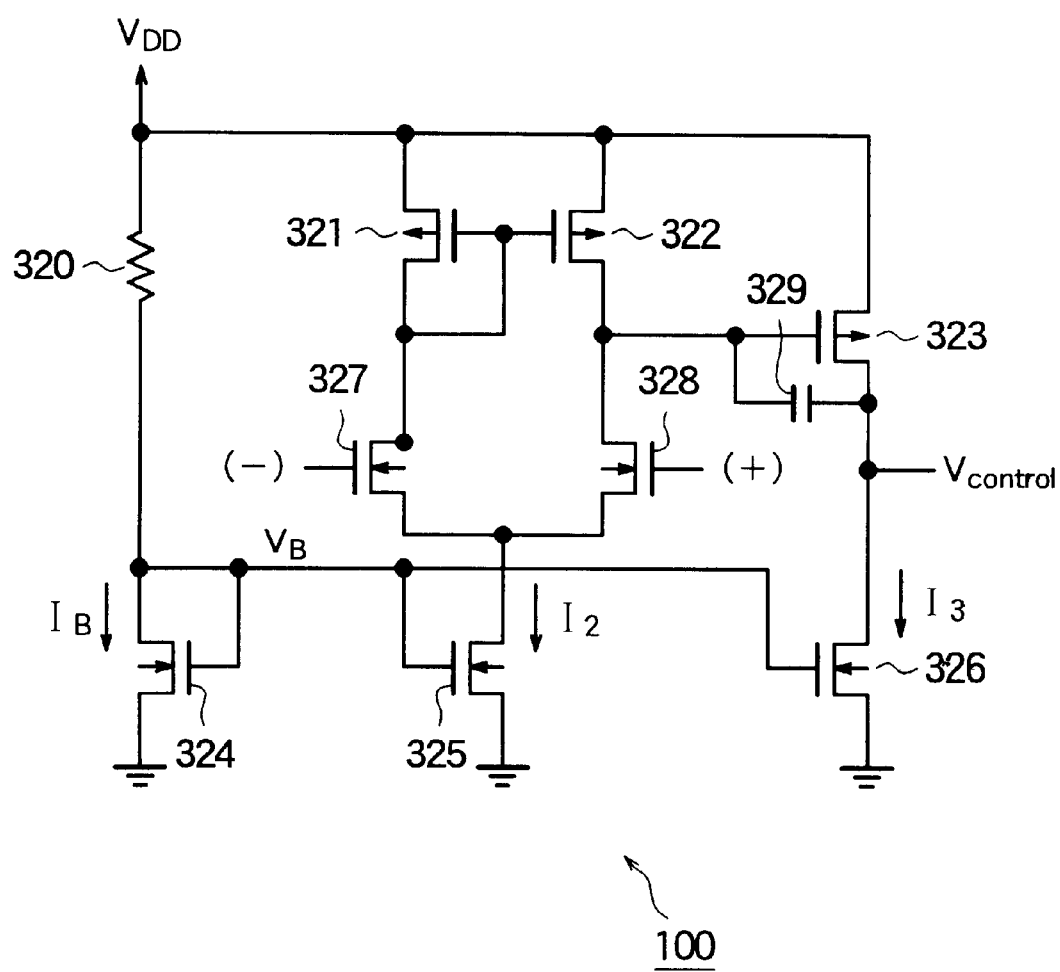
FIG. 9 is a circuit diagram of the operational amplifier in the third embodiment.

FIG. 9 shows the internal structure of the operational amplifier 100 in the third embodiment, comprising a resistor 320, p-channel MOS transistors 321, 322, 323, n-channel MOS transistors 324, 325, 326, 327, 328, and a capacitor 329. Resistor 320 is coupled in series with n-channel MOS transistor 324 to generate a bias voltage $V_B$, which is applied to the gate electrodes of n-channel MOS transistors 324, 325, 326, permitting substantially constant currents $I_B$, $I_2$, and $I_3$ to flow.

The p-channel MOS transistors 321, 322 and n-channel MOS transistors 325, 327, 328 form a differential amplifying circuit. The gate terminal of transistor 328 is the non-inverting input terminal (+) of the operational amplifier 100; the gate n-channel MOS transistor 327 is the inverting input terminal (−). The p-channel MOS transistor 323 and n-channel MOS transistor 326 form an output amplifying circuit, the drain terminals of both of these transistors being coupled to the output terminal of the operational amplifier 100.

The current-sinking capability of the operational amplifier 100 is limited by the saturation current $I_3$ of n-channel MOS transistor 326. In the third embodiment, this saturation current $I_3$ is at least one hundred ninety-two times the saturation current $I_{DSS}$ of the n-channel MOS transistor $TN_1$ in the pre-buffer circuit $G_1$. Since $I_{DSS}$ is limited to a small value, the necessary value of $I_3$ can be obtained with practical values of the bias voltage $V_B$ and the gate width and length of n-channel MOS transistor 326.

The other circuit elements in the third embodiment are the same as in the prior art. The p-channel MOS transistor $TP_1$ has a minimal gate length.

Next, the operation of the third embodiment will be described.

As in the second embodiment, when the output of the gate circuit 207 in FIG. 7 goes high to turn on transistors $TN_1$ and $Tr_1$ and drive the LED $LD_1$, the gate-source capacitance of p-channel MOS transistor $Tr_1$ is charged by a transient current flow $I_1$ through n-channel MOS transistor $TN_1$, reducing the gate potential of transistor $Tr_1$ from $V_{DD}$ to $V_{control}$. At the instant when n-channel MOS transistor $TN_1$ turns on, its drain-source voltage is equal to the difference between $V_{DD}$ and $V_{control}$, and is therefore the same as its gate source voltage $V_{GS}$ (1.6 V).

Figure 10:
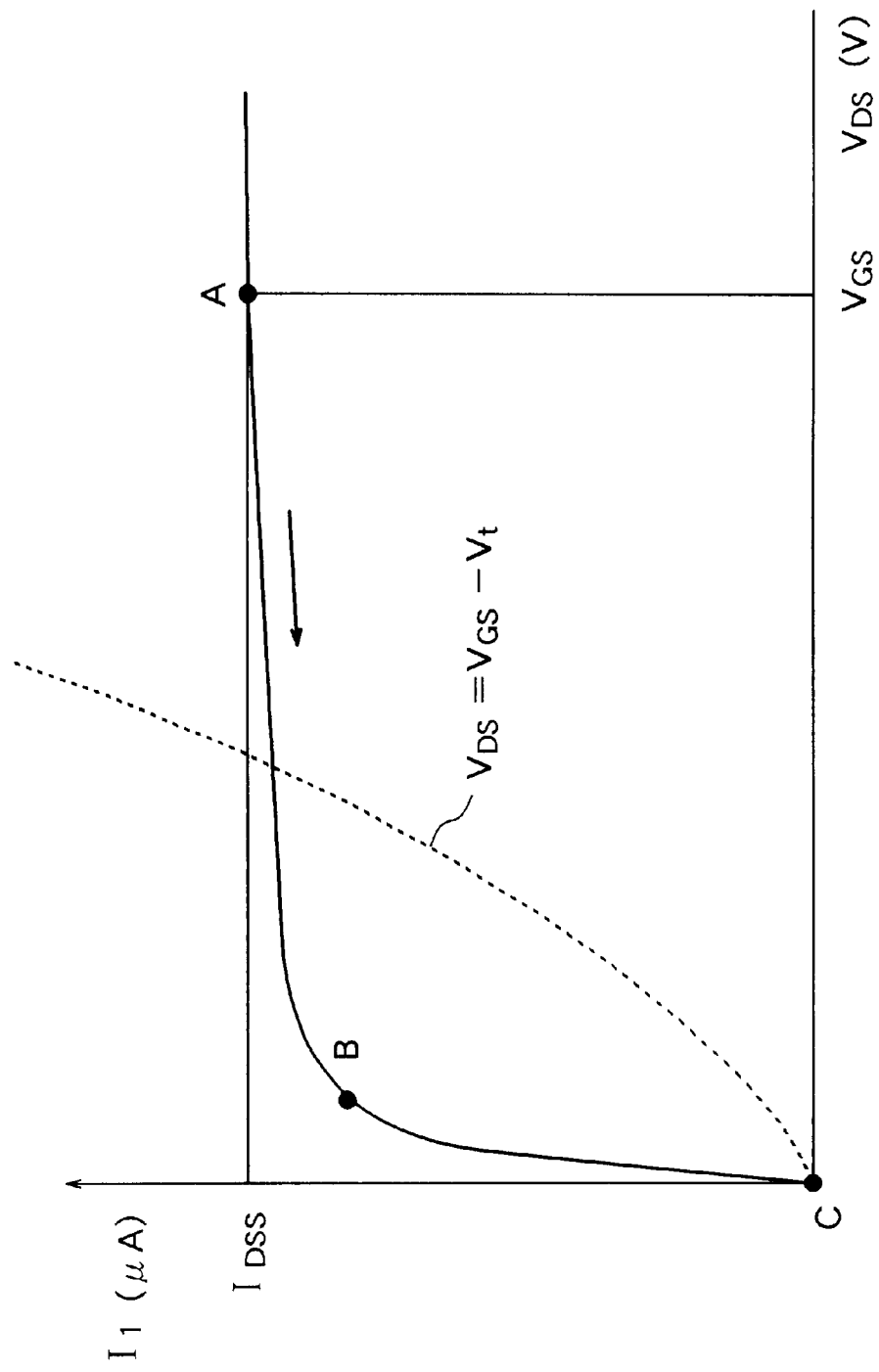
FIG. 10 is a graph of the drain current characteristic of transistor $TN_1$ in FIG. 7, illustrating the operation of the third embodiment.

FIG. 10 indicates the subsequent operation of n-channel MOS transistor $TN_1$, showing the charging current $I_1$ on the vertical axis and the drain-source voltage $V_{DS}$ on the horizontal axis. In the initial state, indicated by point A, charging current $I_1$ flows at the saturation level $I_{DSS}$ of transistor $TN_1$. The drain-source voltage of transistor $TN_1$ falls together with the gate potential of transistor $Tr_1$, but charging current $I_1$ continues to flow at substantially the same rate until about point B. The saturation region is usually defined to be the region to the right of the dashed line, in which the drain-source voltage $V_{DS}$ exceeds the difference between the gate-source voltage $V_{GS}$ and threshold voltage $V_t$, but because of the long gate length of transistor $TN_1$, the current flow remains nearly saturated for some distance to the left of this line. By the time point B is reached, the gate-source capacitance of transistor $Tr_1$ has been almost completely charged. The charging process is completed at lower current levels from point B to point C.

The charging current $I_1$ depicted in FIG. 10 becomes part of the current $I_3$ in FIG. 9. Since the saturation current of transistor 326 is at least one hundred ninety-two times the saturation current of transistor $TN_1$, all of the charging current flow shown in FIG. 10 can be absorbed into the current $I_3$ in FIG. 9, even if all one hundred ninety-two dots are driven simultaneously.

Figure 11:
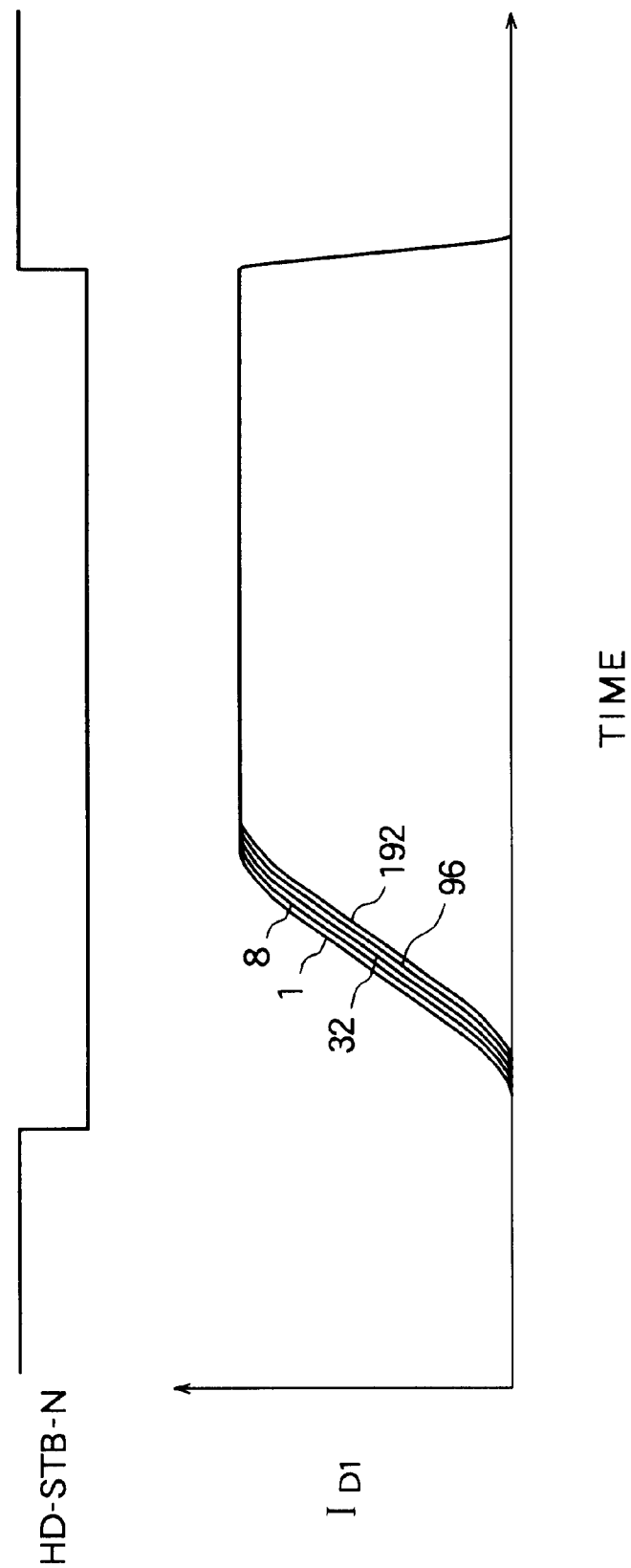
FIG. 11 is a waveform diagram illustrating the operation of the third embodiment.

FIG. 11 shows the strobe signal waveform (HD-STB-N) and driving current waveforms ($I_{D1}$) for LED $LD_1$ when one, eight, thirty-two, ninety-six, and one hundred ninety-two dots are driven simultaneously. Since the charging current is limited by n-channel MOS transistor $TN_1$ rather than by the current-sinking capability of the operational amplifier 100, all of the current-driving waveforms $I_{D1}$ are substantially identical. The rise time of the driving current is substantially independent of the number of driven dots.

When the strobe signal (HD-STB-N) goes high, the gate-source capacitance of transistor $Tr_1$ is discharged quickly to $V_{DD}$ through p-channel MOS transistor $TP_1$. The fall times of the driving current waveforms are also substantially independent of the number of driven dots. The illumination received by each dot is substantially the same, regardless of the number of driven dots.

In the prior art, n-channel MOS transistor $TN_1$ is conventionally given a minimum gate length, to minimize the turn-on time of the driving element $Tr_1$. As a result, n-channel MOS transistor $TN_1$ has a drain current characteristic similar to curve a, for example, in FIG. 8, rising to a comparatively high level in the region of interest ($V_{DS} \leq V_{GS}$), instead of being held to a constant low level. Under these conditions, it becomes impractical to design the operational amplifier 100 to sink charging current from the pre-buffer circuits of all dots at once.

Figure 12:
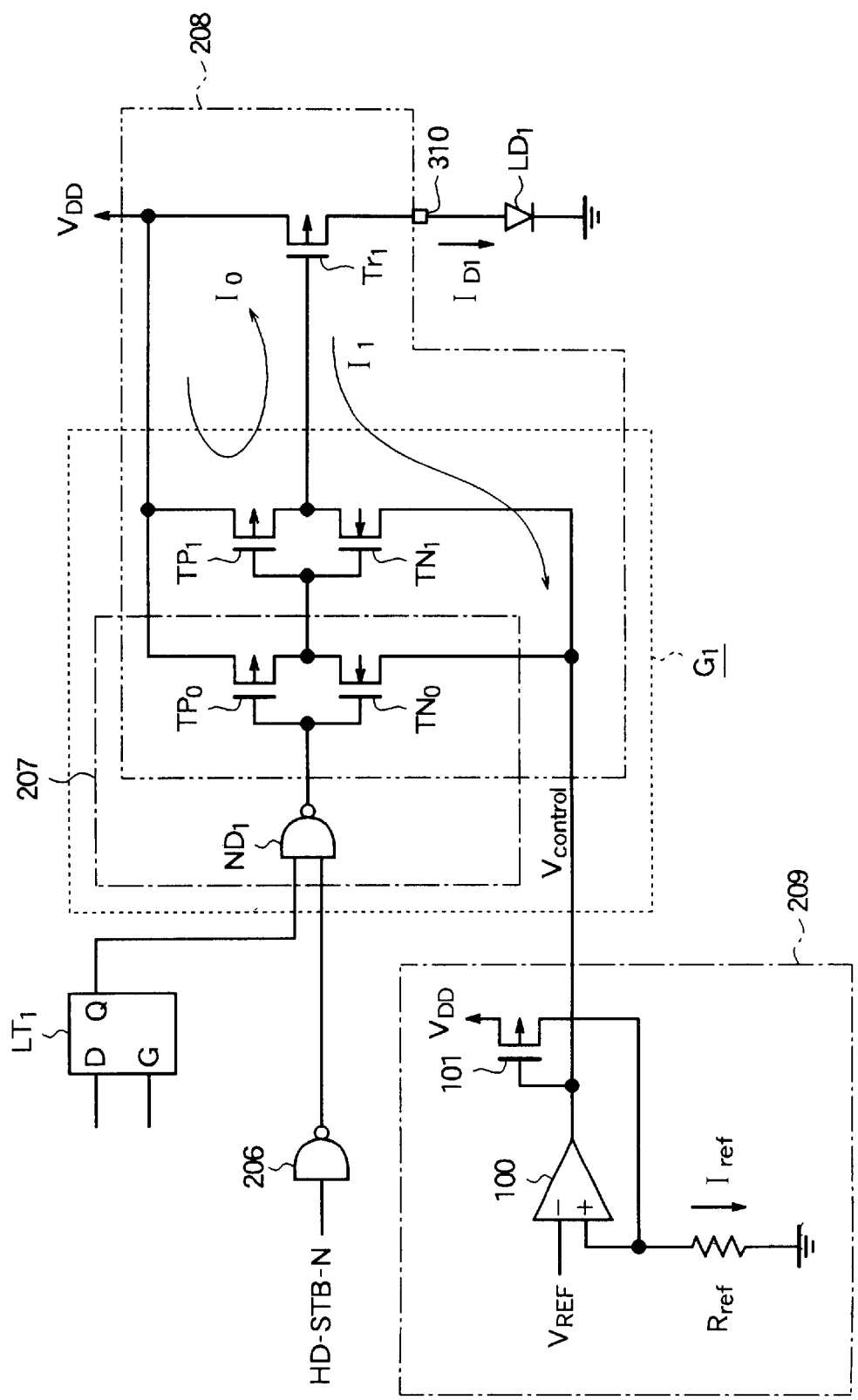
FIG. 12 is a circuit diagram showing the configuration of the LED driving circuit in the LED head according to a fourth embodiment of the invention.

Next, a fourth embodiment of the invention will be described. Referring to FIG. 12, the LED driving circuit 208 in the fourth embodiment comprises p-channel MOS transistors $TP_0$, $TP_1$, $Tr_1$, and n-channel MOS transistors $TN_0$ and $TN_1$. The driving element $Tr_1$ and n-channel MOS transistor $TN_1$ are identical to the corresponding elements in the third embodiment, both having longer-than-minimum gate lengths. In the fourth embodiment, the gate length of p-channel MOS transistor $TP_1$ is also longer than the minimum length, although still shorter than the gate length of n-channel MOS transistor $TN_1$.

In the pre-buffer circuit $G_1$ in the fourth embodiment, transistors $TP_0$ and $TN_0$ form an intermediate stage between a NAND gate $ND_1$ and the output stage, which comprises transistors $TP_1$ and $TN_1$. Transistors $TP_0$ and $TN_0$ constitute an inverter that, combined with NAND gate $ND_1$, forms an AND gate in the gate circuit 207. Differing from the preceding embodiments, in which the AND gate outputs a low logic level equal to the ground potential, the low AND logic level output in the fourth embodiment is the control voltage $V_{control}$, which is supplied instead of the ground potential to the source terminal of n-channel MOS transistor $TN_0$. The control voltage $V_{control}$ thus functions as the ground potential of both the intermediate stage and the output stage of the pre-buffer circuit $G_1$.

The other elements in the fourth embodiment are identical to the corresponding elements in the third embodiment.

Next, the operation of the fourth embodiment in driving LED $LD_1$ will be described. A control voltage $V_{control}$ of 3.4 V will again be assumed.

Figure 13:
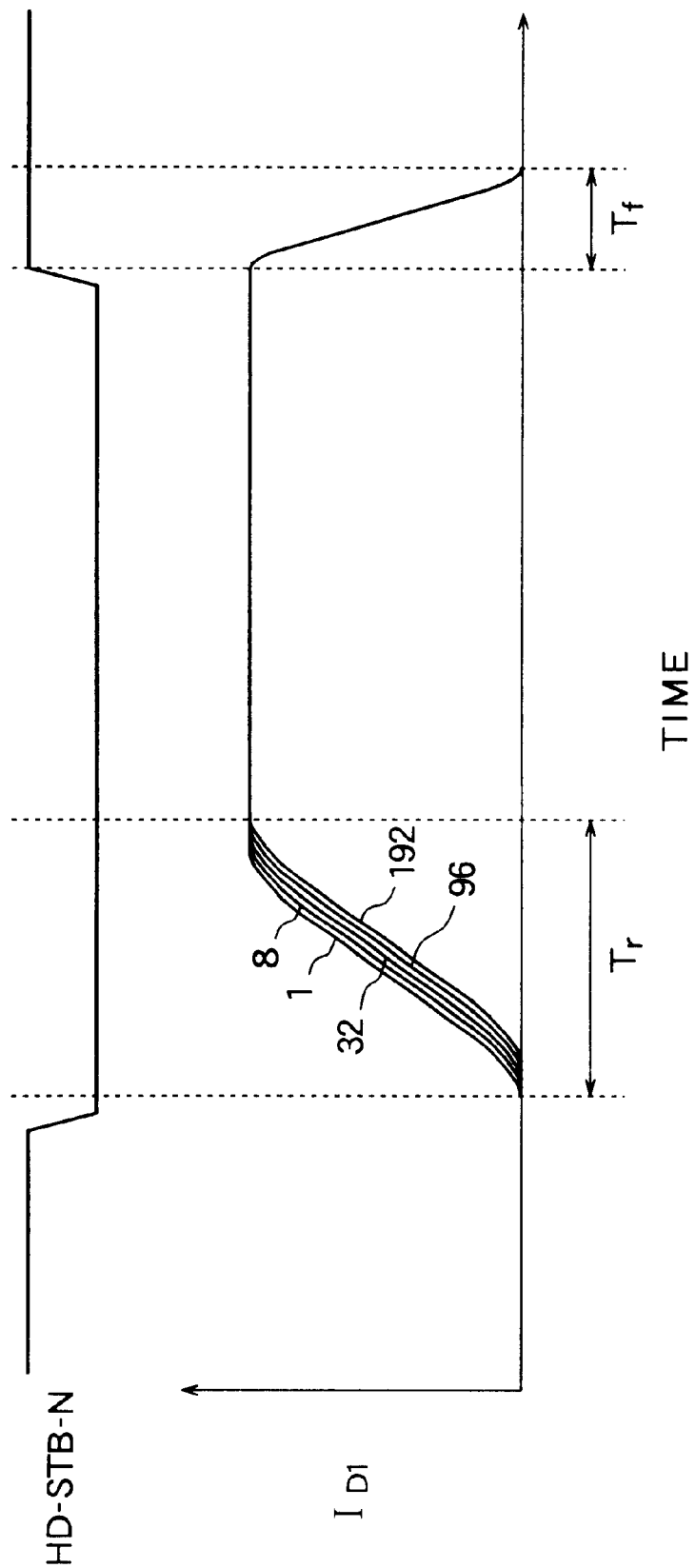
FIG. 13 is a waveform diagram illustrating the operation of the fourth embodiment.

When the strobe signal (HD-STB-N) is driven low, it is inverted three times, by inverter 206, NAND gate $ND_1$, and the inverter comprising transistors $TP_0$ and $TN_0$, resulting in high output, at the $V_{DD}$ potential, from p-channel MOS transistor $TP_0$ to the gate electrodes of transistors $TP_1$ and $TN_1$. The n-channel MOS transistor $TN_1$ operates just as in the third embodiment, conducting a substantially constant current $I_1$ that charges the gate-source capacitance of the driving element $Tr_1$ at a controlled rate. Referring to FIG. 13, the driving current waveform ($I_{D1}$) rises in the same amount of time $Tr_1$ regardless of the number of driven dots.

When the strobe signal (HD-STB-N) is driven high again, n-channel MOS transistor $TN_0$ supplies the control voltage $V_{control}$ to the gate electrodes of transistors $TP_1$ and $TN_1n$. The n-channel MOS transistor $TN_1$ turns off because its gate-source voltage is now zero. The gate-source voltage $V_{GS}$ of the p-channel MOS transistor $TP_1$ is equal to the difference between $V_{control}$ and the power-supply potential $V_{DD}$. This difference is held to a constant value (1.6 V) by the control-voltage generating circuit 209, and is large enough to turn on transistor $TP_1$, causing discharging current $I_0$ to flow into the gate terminal of the driving element $Tr_1$.

Due to the increased gate length of p-channel MOS transistor $TP_1$, and to its comparatively small and precisely controlled gate-source voltage $V_{GS}$ (1.6 V), transistor $TP_1$ operates with a constant-current characteristic. The discharging current $I_0$ in the fourth embodiment is limited to a comparatively small value, and the driving element $Tr_1$ turns off more slowly than in the third embodiment, increasing the fall time $T_f$ of the driving current ($I_{D1}$), as shown in FIG. 13. Since p-channel MOS transistor $TP_1$ has a shorter gate length than n-channel MOS transistor $TN_1$, the fall time $T_f$ is shorter than the rise time $T_r$.

The increased fall time $T_f$ reduces the amount of voltage noise generated at the power-supply leads of the driver IC 202, the voltage noise being inversely proportional to $T_f$. The constant-current characteristic with which p-channel MOS transistor $TP_1$ operates enables the fall time $T_f$ to be set to a desired value by suitable design of the dimensions of transistor $TP_1$, so that voltage noise can be reduced to a desired level through simple design calculations.

To summarize the fourth embodiment, by providing the pre-buffer circuit with constant-current output characteristics for both charging and discharging current, a uniform rise time of the LED driving current is obtained, regardless of the number of driven dots, and the voltage noise caused by the discharging current is reduced to a controllable, harmless level.

Figure 14:
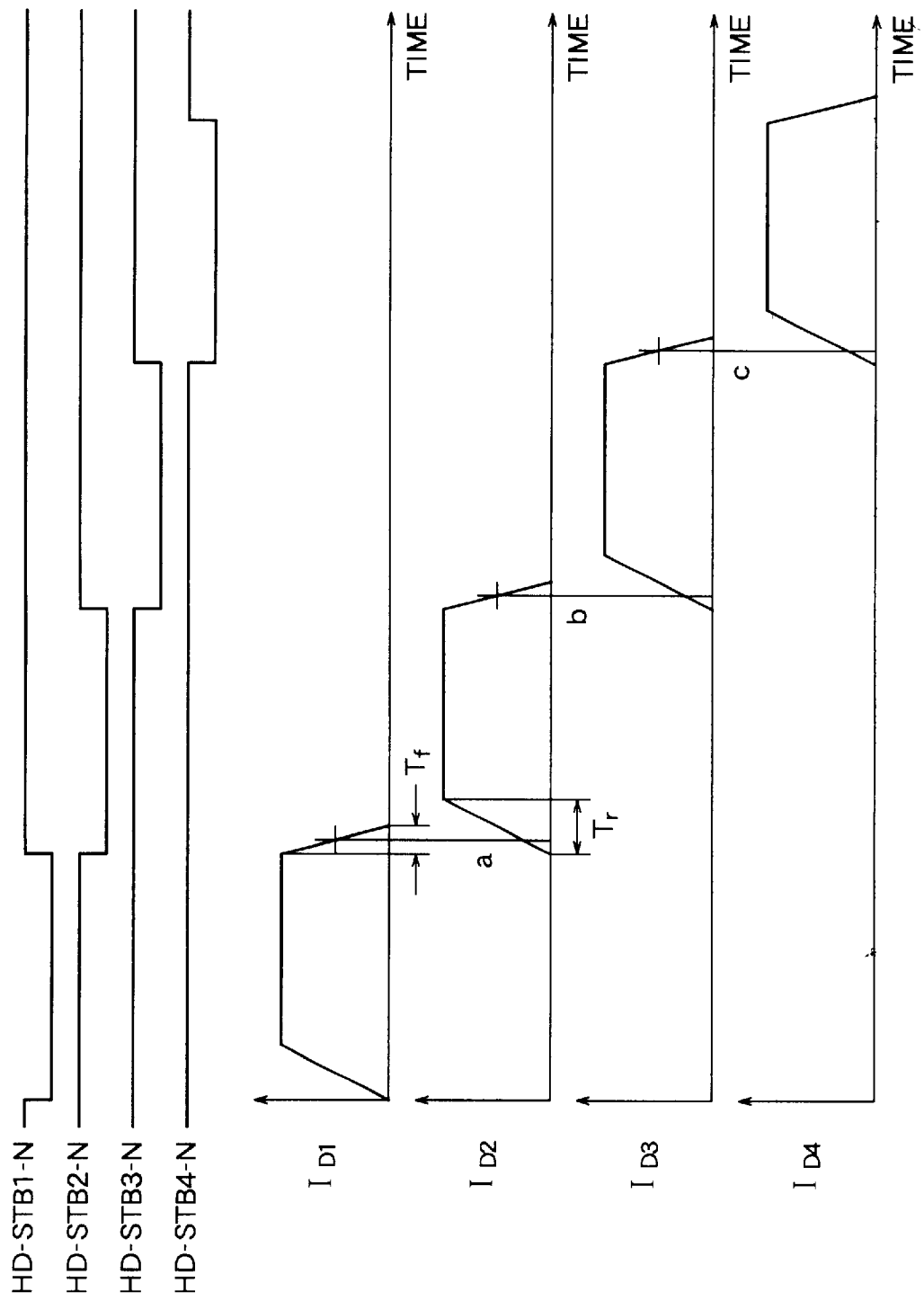
FIG. 14 is a waveform diagram illustrating the operation of a variation of the fourth embodiment.

FIG. 14 illustrates a variation of the fourth embodiment, in which the LED head is divided lengthwise into four blocks, with respective strobe signals HD-STB1-N, HD-STB2-N, HD-STB3-N, HD-STB4-N. Each driver IC 202 receives one of these four strobe signals. The strobe timing is staggered so that at most one-fourth of the LEDs in the LED head are driven simultaneously, thereby limiting the total driving current flowing at any one time to a maximum value that can be provided by a small and inexpensive power supply.

It is important that the driving current waveforms $I_{D1}$, $I_{D2}$, $I_{D3}$, $I_{D4}$ of adjacent blocks not overlap so much around points a, b, and c that the allowable maximum current value is exceeded. Making the fall time $T_f$ shorter than the rise time $T_r$ enables this condition to be satisfied with a margin of safety. The constant-current output characteristics of the pre-buffer circuits simplify the relevant design calculations.

The preceding embodiments have been described in relation to an electrophotographic printer, but the invented driving circuit can also be used in a thermal printer, and in various types of display devices.

The current-limiting transistors of the second embodiment can be used to increase the turn-on and turn-off times of the switching transistors $M_2$ in the first embodiment, to reduce voltage noise.

Those skilled in the art will recognize that further variations are possible within the scope claimed below.

What is claimed is:

1. A driving circuit supplying driving current to a driven element, comprising:

a first driving element determining a current value of the driving current, having a control terminal;

a second driving element, coupled in series with said first driving element and in series with said driven element, switching said driving current on and off; and a control-voltage generating circuit coupled to the control terminal of said first driving element, that supplies a control voltage to the control terminal of said first driving element, to cause said first driving element to supply a constant driving current to said driven element.

2. The driving circuit of claim 1, wherein said first driving element and said second driving element are p-channel MOS transistors each having a source, a gate, and a drain, said control terminal being the gate of said first driving element.

3. The driving circuit of claim 2, wherein said driven element is a light-emitting element having an anode, the gate of said first driving element is coupled to said control-voltage generating circuit, the source of said first driving element is coupled to a power supply, the drain of said first driving element is coupled to the source of said second driving element, and the drain of said second driving element is coupled to the anode of said driven element.

4. The driving circuit of claim 2, wherein said first driving element and said second driving element are fabricated by a semiconductor fabrication process allowing a predetermined minimum gate length, the gate of said first driving element is longer than said minimum gate length, and the gate of said second driving element has said minimum gate length.

5. The driving circuit of claim 1, wherein:

said first driving element, said second driving element, and said driven element constitute a driving unit;

said driving circuit comprises a plurality of driving units, each identical to said driving unit; and said control-voltage generating circuit supplies said control voltage to each of said driving units.

6. A driving circuit having a plurality of driving elements that supply driving current from a power supply to respective driven elements, comprising:

a control-voltage generating circuit that generates a control voltage;

a plurality of pre-stage circuits, coupled to said control-voltage generating circuit and to respective control terminals of said driving elements, that selectively supply the control voltage to said control terminals of respective driving elements on respective paths, thereby switching the control voltage supplied driving elements on; and a plurality of current-limiting resistors, coupled in series between said pre-stage circuits and said respective driving elements on the respective paths on which the control voltage is supplied to said driving elements, said resistors, limiting current flow between said driving elements and said control-voltage generating circuit.

7. The driving circuit of claim 6, wherein said driving elements are MOS transistors with respective gates, said control terminals being the gates of said driving elements, and said current-limiting resistors are coupled between said gates and respective pre-stage circuits.

8. A driving circuit having a plurality of driving elements that supply driving current from a power supply to respective driven elements, comprising:

a control-voltage generating circuit that generates a control voltage; and a plurality of pre-stage circuits, coupled in series between said control-voltage generating circuit and respective control terminals of respective driving elements, selectively supplying the control voltage to said control terminals of said respective driving elements, thereby switching the control voltage supplied driving elements on, said pre-stage circuits operating with constant-current output characteristics that limit current flow between said driving elements and said control-voltage generating circuit.

9. The driving circuit of claim 8, wherein each of said pre-stage circuits has an output stage, and said control voltage is used as a ground potential of said output stage.

10. The driving circuit of claim 9, wherein each of said pre-stage circuits also has an intermediate stage driving said output stage, and said control voltage is also used as a ground potential of said intermediate stage.

11. The driving circuit of claim 8, wherein said pre-stage circuits comprise MOS transistors fabricated by a semiconductor fabrication process allowing a predetermined minimum gate length, and said constant-current characteristics are obtained by providing at least some of said MOS transistors with gates longer than said minimum gate length.

12. The driving circuit of claim 11, wherein each of said pre-stage circuits has an output stage comprising a complementary pair of MOS transistors coupled in series between said control-voltage generating circuit and said power supply.

13. The driving circuit of claim 12, wherein just one of the MOS transistors in said complementary pair has a gate longer than said minimum gate length.

14. The driving circuit of claim 12, wherein both of the MOS transistors in said complementary pair have gates longer than said minimum gate length.

15. The driving circuit of claim 14, wherein each of said pre-stage circuits also has an intermediate stage switchably supplying said control voltage to the gates of both of the MOS transistors in said complementary pair.

16. An LED head comprising the driving circuit of claim 1, wherein said driven elements are light-emitting diodes.

17. An LED head comprising the driving circuit of claim 6, wherein said driven elements are light-emitting diodes.

18. An LED head comprising the driving circuit of claim 8, wherein said driven elements are light-emitting diodes.

* * * * *